(12) United States Patent  (10) Patent No.: US 12,215,289 B2
Quanci et al.  (45) Date of Patent: *Feb. 4, 2025

(54) HIGH-QUALITY COKE PRODUCTS

(71) Applicant: SUNCOKE TECHNOLOGY AND DEVELOPMENT LLC, Lisle, IL (US)

(72) Inventors: John Francis Quanci, Haddonfield, NJ (US); Jonathan Perkins, Lisle, IL (US)

(73) Assignee: SUNCOKE TECHNOLOGY AND DEVELOPMENT LLC, Lisle, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/793,631

(22) Filed: Aug. 2, 2024

(65) Prior Publication Data

US 2024/0392204 A1  Nov. 28, 2024

Related U.S. Application Data

(63) Continuation of application No. 18/466,549, filed on Sep. 13, 2023, which is a continuation of application No. 17/306,895, filed on May 3, 2021, now Pat. No. 11,767,482.

(60) Provisional application No. 63/019,405, filed on May 3, 2020.

(51) Int. Cl.
    *C10L 5/36*  (2006.01)
    *C10L 5/04*  (2006.01)

(52) U.S. Cl.
    CPC .............. *C10L 5/36* (2013.01); *C10L 5/04* (2013.01); *Y02E 50/10* (2013.01)

(58) Field of Classification Search
    CPC .............. C10L 5/36; C10L 5/04; Y02E 50/10
    See application file for complete search history.

(56) References Cited

U.S. PATENT DOCUMENTS

| | | |
|---|---|---|
| 425,797 A | 4/1890 | Hunt |
| 469,868 A | 3/1892 | Osbourn |
| 705,926 A | 7/1902 | Hemingway |
| 760,372 A | 5/1904 | Beam |
| 845,719 A | 2/1907 | Schniewind |
| 875,989 A | 1/1908 | Garner |
| 976,580 A | 7/1909 | Krause |
| 1,140,798 A | 5/1915 | Carpenter |
| 1,424,777 A | 8/1922 | Schondeling |
| 1,429,346 A | 9/1922 | Horn |
| 1,430,027 A | 9/1922 | Plantinga |
| 1,486,401 A | 3/1924 | Van Ackeren |
| 1,530,995 A | 3/1925 | Geiger |
| 1,572,391 A | 2/1926 | Klaiber |

(Continued)

FOREIGN PATENT DOCUMENTS

| | | |
|---|---|---|
| CA | 1172895 | 8/1984 |
| CA | 2775992 | 5/2011 |

(Continued)

OTHER PUBLICATIONS

U.S. Appl. No. 18/892,228, filed Sep. 20, 2024, Quanci et al.

(Continued)

*Primary Examiner* — Cephia D Toomer
(74) *Attorney, Agent, or Firm* — Perkins Coie LLP (57) ABSTRACT

High quality coke products including unique properties, such as Coke Reactivity Index (CRI) properties, fixed carbon content, and sulfur content.

20 Claims, 5 Drawing Sheets
(5 of 5 Drawing Sheet(s) Filed in Color)

(56) References Cited

U.S. PATENT DOCUMENTS

| | | |
|---|---|---|
| 1,677,973 A | 7/1928 | Marquard |
| 1,705,039 A | 3/1929 | Thornhill |
| 1,721,813 A | 7/1929 | Geipert |
| 1,757,682 A | 5/1930 | Palm |
| 1,818,370 A | 8/1931 | Wine |
| 1,818,994 A | 8/1931 | Kreisinger |
| 1,830,951 A | 11/1931 | Lovett |
| 1,848,818 A | 3/1932 | Becker |
| 1,895,202 A | 1/1933 | Montgomery |
| 1,947,499 A | 2/1934 | Schrader et al. |
| 1,955,962 A | 4/1934 | Jones |
| 1,979,507 A | 11/1934 | Underwood |
| 2,075,337 A | 3/1937 | Burnaugh |
| 2,141,035 A | 12/1938 | Daniels |
| 2,195,466 A | 4/1940 | Otto |
| 2,235,970 A | 3/1941 | Wilputte |
| 2,340,283 A | 1/1944 | Vladu |
| 2,340,981 A | 2/1944 | Otto |
| 2,343,034 A | 2/1944 | Weber |
| 2,394,173 A | 2/1946 | Harris et al. |
| 2,424,012 A | 7/1947 | Bangham et al. |
| 2,486,199 A | 10/1949 | Nier |
| 2,609,948 A | 9/1952 | Laveley |
| 2,641,575 A | 6/1953 | Otto |
| 2,649,978 A | 8/1953 | Smith |
| 2,667,185 A | 1/1954 | Beavers |
| 2,723,725 A | 11/1955 | Keiffer |
| 2,756,842 A | 7/1956 | Chamberlin et al. |
| 2,765,266 A | 10/1956 | Throop et al. |
| 2,813,708 A | 11/1957 | Frey |
| 2,827,424 A | 3/1958 | Homan |
| 2,873,816 A | 2/1959 | Emil et al. |
| 2,902,991 A | 9/1959 | Whitman |
| 2,907,698 A | 10/1959 | Schulz |
| 2,968,083 A | 1/1961 | Lentz et al. |
| 3,010,882 A | 11/1961 | Barclay et al. |
| 3,015,893 A | 1/1962 | McCreary |
| 3,026,715 A | 3/1962 | Briggs |
| 3,033,764 A | 5/1962 | Hannes |
| 3,085,582 A | 4/1963 | Slosman |
| 3,175,961 A | 3/1965 | Samson |
| 3,199,135 A | 8/1965 | Trucker |
| 3,224,805 A | 12/1965 | Clyatt |
| 3,259,551 A | 7/1966 | Thompson, Jr. |
| 3,265,044 A | 8/1966 | Juchtern |
| 3,267,913 A | 8/1966 | Jakob |
| 3,327,521 A | 6/1967 | Briggs |
| 3,342,990 A | 9/1967 | Barrington et al. |
| 3,444,046 A | 5/1969 | Harlow |
| 3,444,047 A | 5/1969 | Wilde |
| 3,448,012 A | 6/1969 | Allred |
| 3,453,839 A | 7/1969 | Sabin |
| 3,462,345 A | 8/1969 | Kernan |
| 3,462,346 A | 8/1969 | Kernan et al. |
| 3,511,030 A | 5/1970 | Brown et al. |
| 3,542,650 A | 11/1970 | Kulakov |
| 3,545,470 A | 12/1970 | Paton |
| 3,587,198 A | 6/1971 | Hensel |
| 3,591,827 A | 7/1971 | Hall |
| 3,592,742 A | 7/1971 | Thompson |
| 3,616,408 A | 10/1971 | Hickam |
| 3,623,511 A | 11/1971 | Levin |
| 3,630,852 A | 12/1971 | Nashan et al. |
| 3,652,403 A | 3/1972 | Knappstein et al. |
| 3,676,305 A | 7/1972 | Cremer |
| 3,709,794 A | 1/1973 | Kinzler et al. |
| 3,710,551 A | 1/1973 | Sved |
| 3,746,626 A | 7/1973 | Morrison, Jr. |
| 3,748,235 A | 7/1973 | Pries |
| 3,784,034 A | 1/1974 | Thompson |
| 3,806,032 A | 4/1974 | Pries |
| 3,811,572 A | 5/1974 | Tatterson |
| 3,836,161 A | 10/1974 | Pries |
| 3,839,156 A | 10/1974 | Jakobi et al. |
| 3,844,900 A | 10/1974 | Schulte |
| 3,857,758 A | 12/1974 | Mole |
| 3,875,016 A | 4/1975 | Schmidt-Balve |
| 3,876,143 A | 4/1975 | Rossow et al. |
| 3,876,506 A | 4/1975 | Dix et al. |
| 3,878,053 A | 4/1975 | Hyde |
| 3,894,302 A | 7/1975 | Lasater |
| 3,897,312 A | 7/1975 | Armour et al. |
| 3,906,992 A | 9/1975 | Leach |
| 3,912,091 A | 10/1975 | Thompson |
| 3,912,597 A | 10/1975 | MacDonald |
| 3,917,458 A | 11/1975 | Polak |
| 3,928,144 A | 12/1975 | Jakimowicz |
| 3,930,961 A | 1/1976 | Sustarsic et al. |
| 3,933,443 A | 1/1976 | Lohrmann |
| 3,957,591 A | 5/1976 | Riecker |
| 3,959,084 A | 5/1976 | Price |
| 3,963,582 A | 6/1976 | Helm et al. |
| 3,969,191 A | 7/1976 | Bollenbach |
| 3,975,148 A | 8/1976 | Fukuda et al. |
| 3,979,870 A | 9/1976 | Moore |
| 3,984,289 A | 10/1976 | Sustarsic et al. |
| 3,990,948 A | 11/1976 | Lindgren |
| 4,004,702 A | 1/1977 | Szendroi |
| 4,004,983 A | 1/1977 | Pries |
| 4,025,395 A | 5/1977 | Ekholm et al. |
| 4,040,910 A | 8/1977 | Knappstein et al. |
| 4,045,056 A | 8/1977 | Kandakov et al. |
| 4,045,299 A | 8/1977 | McDonald |
| 4,059,885 A | 11/1977 | Oldengott |
| 4,065,059 A | 12/1977 | Jablin |
| 4,067,462 A | 1/1978 | Thompson |
| 4,077,848 A | 3/1978 | Grainer et al. |
| 4,083,753 A | 4/1978 | Rogers et al. |
| 4,086,231 A | 4/1978 | Ikio |
| 4,093,245 A | 6/1978 | Connor |
| 4,100,033 A | 7/1978 | Holter |
| 4,100,491 A | 7/1978 | Newman, Jr. et al. |
| 4,100,889 A | 7/1978 | Chayes |
| 4,111,757 A | 9/1978 | Carimboli |
| 4,124,450 A | 11/1978 | MacDonald |
| 4,133,720 A | 1/1979 | Franzer et al. |
| 4,135,948 A | 1/1979 | Mertens et al. |
| 4,141,796 A | 2/1979 | Clark et al. |
| 4,143,104 A | 3/1979 | van Konijnenburg et al. |
| 4,145,195 A | 3/1979 | Knappstein et al. |
| 4,147,230 A | 4/1979 | Ormond et al. |
| 4,162,546 A | 7/1979 | Shortell et al. |
| 4,176,013 A | 11/1979 | Garthus et al. |
| 4,181,459 A | 1/1980 | Price |
| 4,189,272 A | 2/1980 | Gregor et al. |
| 4,194,951 A | 3/1980 | Pries |
| 4,196,053 A | 4/1980 | Grohmann |
| 4,211,608 A | 7/1980 | Kwasnoski et al. |
| 4,211,611 A | 7/1980 | Bocsanczy |
| 4,213,489 A | 7/1980 | Cain |
| 4,213,828 A | 7/1980 | Calderon |
| 4,222,748 A | 9/1980 | Argo et al. |
| 4,222,824 A | 9/1980 | Flockenhaus et al. |
| 4,224,109 A | 9/1980 | Flockenhaus et al. |
| 4,225,393 A | 9/1980 | Gregor et al. |
| 4,226,113 A | 10/1980 | Pelletier et al. |
| 4,230,498 A | 10/1980 | Ruecki |
| 4,235,830 A | 11/1980 | Bennett et al. |
| 4,239,602 A | 12/1980 | La Bate |
| 4,248,671 A | 2/1981 | Belding |
| 4,249,997 A | 2/1981 | Schmitz |
| 4,263,099 A | 4/1981 | Porter |
| 4,268,360 A | 5/1981 | Tsuzuki et al. |
| 4,271,814 A | 6/1981 | Lister |
| 4,284,478 A | 8/1981 | Brommel |
| 4,285,772 A | 8/1981 | Kress |
| 4,287,024 A | 9/1981 | Thompson |
| 4,289,479 A | 9/1981 | Johnson |
| 4,289,584 A | 9/1981 | Chuss et al. |
| 4,289,585 A | 9/1981 | Wagener et al. |
| 4,296,938 A | 10/1981 | Offermann et al. |
| 4,298,497 A | 11/1981 | Colombo |
| 4,299,666 A | 11/1981 | Ostmann |
| 4,302,935 A | 12/1981 | Cousimano |

(56) References Cited

U.S. PATENT DOCUMENTS

| | | |
|---|---|---|
| 4,303,615 A | 12/1981 | Jarmell et al. |
| 4,307,673 A | 12/1981 | Caughey |
| 4,314,787 A | 2/1982 | Kwasnik et al. |
| 4,316,435 A | 2/1982 | Nagamatsu et al. |
| 4,324,568 A | 4/1982 | Wilcox et al. |
| 4,330,372 A | 5/1982 | Cairns et al. |
| 4,334,963 A | 6/1982 | Stog |
| 4,336,107 A | 6/1982 | Irwin |
| 4,336,843 A | 6/1982 | Petty |
| 4,340,445 A | 7/1982 | Kucher et al. |
| 4,342,195 A | 8/1982 | Lo |
| 4,344,820 A | 8/1982 | Thompson |
| 4,344,822 A | 8/1982 | Schwartz et al. |
| 4,353,189 A | 10/1982 | Thiersch et al. |
| 4,366,029 A | 12/1982 | Bixby et al. |
| 4,373,244 A | 2/1983 | Mertens et al. |
| 4,375,388 A | 3/1983 | Hara et al. |
| 4,385,962 A | 5/1983 | Stewen et al. |
| 4,391,674 A | 7/1983 | Velmin et al. |
| 4,392,824 A | 7/1983 | Struck et al. |
| 4,394,217 A | 7/1983 | Holz et al. |
| 4,395,269 A | 7/1983 | Schuler |
| 4,396,394 A | 8/1983 | Li et al. |
| 4,396,461 A | 8/1983 | Neubaum et al. |
| 4,406,619 A | 9/1983 | Oldengott |
| 4,407,237 A | 10/1983 | Merritt |
| 4,421,070 A | 12/1983 | Sullivan |
| 4,431,484 A | 2/1984 | Weber et al. |
| 4,439,277 A | 3/1984 | Dix |
| 4,440,098 A | 4/1984 | Adams |
| 4,441,892 A | 4/1984 | Schuster |
| 4,445,977 A | 5/1984 | Husher |
| 4,446,018 A | 5/1984 | Cerwick |
| 4,448,541 A | 5/1984 | Lucas |
| 4,452,749 A | 6/1984 | Kolvek et al. |
| 4,459,103 A | 7/1984 | Gieskieng |
| 4,469,446 A | 9/1984 | Goodboy |
| 4,474,344 A | 10/1984 | Bennett |
| 4,487,137 A | 12/1984 | Horvat et al. |
| 4,498,786 A | 2/1985 | Ruscheweyh |
| 4,506,025 A | 3/1985 | Kleeb et al. |
| 4,508,539 A | 4/1985 | Nakai |
| 4,518,461 A | 5/1985 | Gelfand |
| 4,527,488 A | 7/1985 | Lindgren |
| 4,564,420 A | 1/1986 | Spindeler et al. |
| 4,568,424 A | 2/1986 | Bauer |
| 4,568,426 A | 2/1986 | Orlando |
| 4,570,670 A | 2/1986 | Johnson |
| 4,614,567 A | 9/1986 | Stahlherm et al. |
| 4,643,327 A | 2/1987 | Campbell |
| 4,645,513 A | 2/1987 | Kubota et al. |
| 4,655,193 A | 4/1987 | Blacket |
| 4,655,804 A | 4/1987 | Kercheval et al. |
| 4,666,675 A | 5/1987 | Parker et al. |
| 4,680,167 A | 7/1987 | Orlando |
| 4,690,689 A | 9/1987 | Malcosky et al. |
| 4,704,195 A | 11/1987 | Janicka et al. |
| 4,720,262 A | 1/1988 | Durr et al. |
| 4,724,976 A | 2/1988 | Lee |
| 4,726,465 A | 2/1988 | Kwasnik et al. |
| 4,732,652 A | 3/1988 | Durselen et al. |
| 4,749,446 A | 6/1988 | van Laar et al. |
| 4,793,981 A | 12/1988 | Doyle et al. |
| 4,821,473 A | 4/1989 | Cowell |
| 4,824,614 A | 4/1989 | Jones et al. |
| 4,889,698 A | 12/1989 | Moller et al. |
| 4,898,021 A | 2/1990 | Weaver et al. |
| 4,918,975 A | 4/1990 | Voss |
| 4,919,170 A | 4/1990 | Kallinich et al. |
| 4,929,179 A | 5/1990 | Breidenbach et al. |
| 4,941,824 A | 7/1990 | Holter et al. |
| 5,013,408 A | 5/1991 | Asai et al. |
| 5,052,922 A | 10/1991 | Stokman et al. |
| 5,062,925 A | 11/1991 | Durselen et al. |
| 5,078,822 A | 1/1992 | Hodges et al. |
| 5,087,328 A | 2/1992 | Wegerer et al. |
| 5,114,542 A | 5/1992 | Childress et al. |
| 5,213,138 A | 5/1993 | Presz |
| 5,227,106 A | 7/1993 | Kolvek |
| 5,228,955 A | 7/1993 | Westbrook, III |
| 5,234,601 A | 8/1993 | Janke et al. |
| 5,318,671 A | 6/1994 | Pruitt |
| 5,370,218 A | 12/1994 | Johnson et al. |
| 5,398,543 A | 3/1995 | Fukushima et al. |
| 5,423,152 A | 6/1995 | Kolvek |
| 5,447,606 A | 9/1995 | Pruitt |
| 5,480,594 A | 1/1996 | Wilkerson et al. |
| 5,542,650 A | 8/1996 | Abel et al. |
| 5,597,452 A | 1/1997 | Hippe et al. |
| 5,603,810 A | 2/1997 | Michler |
| 5,622,280 A | 4/1997 | Mays et al. |
| 5,659,110 A | 8/1997 | Herden et al. |
| 5,670,025 A | 9/1997 | Baird |
| 5,687,768 A | 11/1997 | Albrecht et al. |
| 5,705,037 A | 1/1998 | Reinke et al. |
| 5,715,962 A | 2/1998 | McDonnell |
| 5,720,855 A | 2/1998 | Baird |
| 5,745,969 A | 5/1998 | Yamada et al. |
| 5,752,548 A | 5/1998 | Matsumoto et al. |
| 5,752,993 A | 5/1998 | Eatough et al. |
| 5,787,821 A | 8/1998 | Bhat et al. |
| 5,810,032 A | 9/1998 | Hong et al. |
| 5,816,210 A | 10/1998 | Yamaguchi |
| 5,857,308 A | 1/1999 | Dismore et al. |
| 5,881,551 A | 3/1999 | Dang |
| 5,913,448 A | 6/1999 | Mann et al. |
| 5,928,476 A | 7/1999 | Daniels |
| 5,966,886 A | 10/1999 | Di Loreto |
| 5,968,320 A | 10/1999 | Sprague |
| 6,002,993 A | 12/1999 | Naito et al. |
| 6,003,706 A | 12/1999 | Rosen |
| 6,017,214 A | 1/2000 | Sturgulewski |
| 6,022,112 A | 2/2000 | Isler et al. |
| 6,059,932 A | 5/2000 | Sturgulewski |
| 6,126,910 A | 10/2000 | Wilhelm et al. |
| 6,139,692 A | 10/2000 | Tamura et al. |
| 6,152,668 A | 11/2000 | Knoch |
| 6,156,688 A | 12/2000 | Ando et al. |
| 6,173,679 B1 | 1/2001 | Bruckner et al. |
| 6,187,148 B1 | 2/2001 | Sturgulewski |
| 6,189,819 B1 | 2/2001 | Racine |
| 6,290,494 B1 | 9/2001 | Barkdoll |
| 6,412,221 B1 | 7/2002 | Emsbo |
| 6,424,457 B1 | 7/2002 | Koonmen et al. |
| 6,495,268 B1 | 12/2002 | Harth, III et al. |
| 6,539,602 B1 | 4/2003 | Ozawa et al. |
| 6,596,128 B2 | 7/2003 | Westbrook |
| 6,626,984 B1 | 9/2003 | Taylor |
| 6,699,035 B2 | 3/2004 | Brooker |
| 6,712,576 B2 | 3/2004 | Skarzenski et al. |
| 6,758,875 B2 | 7/2004 | Reid et al. |
| 6,786,941 B2 | 9/2004 | Reeves et al. |
| 6,830,660 B1 | 12/2004 | Yamauchi et al. |
| 6,907,895 B2 | 6/2005 | Johnson et al. |
| 6,946,011 B2 | 9/2005 | Snyder |
| 6,964,236 B2 | 11/2005 | Schucker |
| 7,056,390 B2 | 6/2006 | Fratello |
| 7,077,892 B2 | 7/2006 | Lee |
| 7,314,060 B2 | 1/2008 | Chen et al. |
| 7,331,298 B2 | 2/2008 | Barkdoll et al. |
| 7,433,743 B2 | 10/2008 | Pistikopoulos et al. |
| 7,497,930 B2 | 3/2009 | Barkdoll et al. |
| 7,547,377 B2 | 6/2009 | Inamasu et al. |
| 7,611,609 B1 | 11/2009 | Valia et al. |
| 7,644,711 B2 | 1/2010 | Creel |
| 7,722,843 B1 | 5/2010 | Srinivasachar |
| 7,727,307 B2 | 6/2010 | Winkler |
| 7,785,447 B2 | 8/2010 | Eatough et al. |
| 7,803,627 B2 | 9/2010 | Hodges et al. |
| 7,823,401 B2 | 11/2010 | Takeuchi et al. |
| 7,827,689 B2 | 11/2010 | Crane |
| 7,998,316 B2 | 8/2011 | Barkdoll |
| 8,071,060 B2 | 12/2011 | Ukai et al. |
| 8,079,751 B2 | 12/2011 | Kapila et al. |

(56) References Cited

U.S. PATENT DOCUMENTS

| | | |
|---|---|---|
| 8,080,088 B1 | 12/2011 | Srinivasachar |
| 8,146,376 B1 | 4/2012 | Williams et al. |
| 8,152,970 B2 | 4/2012 | Barkdoll et al. |
| 8,172,930 B2 | 5/2012 | Barkdoll |
| 8,236,142 B2 | 8/2012 | Westbrook |
| 8,266,853 B2 | 9/2012 | Bloom et al. |
| 8,311,777 B2 | 11/2012 | Suguira et al. |
| 8,383,055 B2 | 2/2013 | Palmer |
| 8,398,935 B2 | 3/2013 | Howell et al. |
| 8,409,405 B2 | 4/2013 | Kim et al. |
| 8,500,881 B2 | 8/2013 | Orita et al. |
| 8,515,508 B2 | 8/2013 | Kawamura et al. |
| 8,568,568 B2 | 10/2013 | Schuecker et al. |
| 8,640,635 B2 | 2/2014 | Bloom et al. |
| 8,647,476 B2 | 2/2014 | Kim et al. |
| 8,800,795 B2 | 8/2014 | Hwang |
| 8,956,995 B2 | 2/2015 | Masatsugu et al. |
| 8,980,063 B2 | 3/2015 | Kim et al. |
| 9,039,869 B2 | 5/2015 | Kim et al. |
| 9,057,023 B2 | 6/2015 | Reichelt et al. |
| 9,103,234 B2 | 8/2015 | Gu et al. |
| 9,169,439 B2 | 10/2015 | Sarpen et al. |
| 9,193,913 B2 | 11/2015 | Quanci et al. |
| 9,193,915 B2 | 11/2015 | West et al. |
| 9,200,225 B2 | 12/2015 | Barkdoll et al. |
| 9,238,778 B2 | 1/2016 | Quanci et al. |
| 9,243,186 B2 | 1/2016 | Quanci et al. |
| 9,249,357 B2 | 2/2016 | Quanci et al. |
| 9,273,249 B2 | 3/2016 | Quanci et al. |
| 9,273,250 B2 | 3/2016 | Choi et al. |
| 9,321,965 B2 | 4/2016 | Barkdoll |
| 9,359,554 B2 | 6/2016 | Quanci et al. |
| 9,404,043 B2 | 8/2016 | Kim |
| 9,463,980 B2 | 10/2016 | Fukada et al. |
| 9,476,547 B2 | 10/2016 | Quanci et al. |
| 9,498,786 B2 | 11/2016 | Pearson |
| 9,580,656 B2 | 2/2017 | Quanci et al. |
| 9,672,499 B2 | 6/2017 | Quanci et al. |
| 9,683,740 B2 | 6/2017 | Rodgers et al. |
| 9,708,542 B2 | 7/2017 | Quanci et al. |
| 9,862,888 B2 | 1/2018 | Quanci et al. |
| 9,976,089 B2 | 5/2018 | Quanci et al. |
| 10,016,714 B2 | 7/2018 | Quanci et al. |
| 10,041,002 B2 | 8/2018 | Quanci et al. |
| 10,047,295 B2 | 8/2018 | Chun et al. |
| 10,047,296 B2 | 8/2018 | Chun et al. |
| 10,053,627 B2 | 8/2018 | Sarpen et al. |
| 10,233,392 B2 | 3/2019 | Quanci et al. |
| 10,308,876 B2 | 6/2019 | Quanci et al. |
| 10,323,192 B2 | 6/2019 | Quanci et al. |
| 10,392,563 B2 | 8/2019 | Kim et al. |
| 10,435,042 B1 | 10/2019 | Weymouth |
| 10,526,541 B2 | 1/2020 | West et al. |
| 10,526,542 B2 | 1/2020 | Quanci et al. |
| 10,578,521 B1 | 3/2020 | Dinakaran et al. |
| 10,611,965 B2 | 4/2020 | Quanci et al. |
| 10,619,101 B2 | 4/2020 | Quanci et al. |
| 10,732,621 B2 | 8/2020 | Cella et al. |
| 10,760,002 B2 | 9/2020 | Ball et al. |
| 10,851,306 B2 | 12/2020 | Crum et al. |
| 10,877,007 B2 | 12/2020 | Steele et al. |
| 10,883,051 B2 | 1/2021 | Quanci et al. |
| 10,920,148 B2 | 2/2021 | Quanci et al. |
| 10,927,303 B2 | 2/2021 | Choi et al. |
| 10,947,455 B2 | 3/2021 | Quanci et al. |
| 10,968,393 B2 | 4/2021 | West et al. |
| 10,968,395 B2 | 4/2021 | Quanci et al. |
| 10,975,309 B2 | 4/2021 | Quanci et al. |
| 10,975,310 B2 | 4/2021 | Quanci et al. |
| 10,975,311 B2 | 4/2021 | Quanci et al. |
| 1,378,782 A1 | 5/2021 | Floyd |
| 11,008,517 B2 | 5/2021 | Chun et al. |
| 11,008,518 B2 | 5/2021 | Quanci et al. |
| 11,021,655 B2 | 6/2021 | Quanci et al. |
| 11,053,444 B2 | 7/2021 | Quanci et al. |
| 11,060,032 B2 | 7/2021 | Quanci et al. |
| 11,071,935 B2 | 7/2021 | Quanci et al. |
| 11,098,252 B2 | 8/2021 | Quanci et al. |
| 11,117,087 B2 | 9/2021 | Quanci |
| 11,142,699 B2 | 10/2021 | West et al. |
| 11,186,778 B2 | 11/2021 | Crum et al. |
| 11,193,069 B2 | 12/2021 | Quanci et al. |
| 11,214,739 B2 | 1/2022 | Quanci et al. |
| 11,261,381 B2 | 3/2022 | Quanci et al. |
| 11,359,145 B2 | 6/2022 | Ball et al. |
| 11,359,146 B2 | 6/2022 | Quanci et al. |
| 11,365,355 B2 | 6/2022 | Quanci et al. |
| 11,395,989 B2 | 7/2022 | Quanci et al. |
| 11,441,077 B2 | 9/2022 | Quanci et al. |
| 11,441,078 B2 | 9/2022 | Quanci et al. |
| 11,486,572 B2 | 11/2022 | Quanci et al. |
| 11,505,747 B2 | 11/2022 | Quanci et al. |
| 11,508,230 B2 | 11/2022 | Quanci et al. |
| 11,597,881 B2 | 3/2023 | Quanci et al. |
| 11,643,602 B2 | 5/2023 | Quanci et al. |
| 11,680,208 B2 | 6/2023 | Quanci et al. |
| 11,692,138 B2 | 7/2023 | Quanci et al. |
| 11,746,296 B2 | 9/2023 | Choi et al. |
| 11,760,937 B2 | 9/2023 | Quanci et al. |
| 11,767,482 B2 * | 9/2023 | Quanci ............... C10L 5/36 44/530 |
| 11,788,012 B2 | 10/2023 | Quanci et al. |
| 11,795,400 B2 | 10/2023 | West et al. |
| 11,807,812 B2 | 11/2023 | Quanci et al. |
| 11,819,802 B2 | 11/2023 | Quanci et al. |
| 11,845,037 B2 | 12/2023 | Quanci et al. |
| 11,845,897 B2 | 12/2023 | Quanci et al. |
| 11,845,898 B2 | 12/2023 | Crum et al. |
| 11,851,724 B2 | 12/2023 | Quanci et al. |
| 11,939,526 B2 | 3/2024 | West et al. |
| 11,946,108 B2 | 4/2024 | Quanci et al. |
| 2002/0170605 A1 | 11/2002 | Shiraishi et al. |
| 2003/0014954 A1 | 1/2003 | Ronning et al. |
| 2003/0015809 A1 | 1/2003 | Carson |
| 2003/0057083 A1 | 3/2003 | Eatough et al. |
| 2004/0016377 A1 | 1/2004 | Johnson et al. |
| 2004/0220840 A1 | 11/2004 | Bonissone et al. |
| 2005/0087767 A1 | 4/2005 | Fitzgerald et al. |
| 2005/0096759 A1 | 5/2005 | Benjamin et al. |
| 2006/0029532 A1 | 2/2006 | Breen et al. |
| 2006/0102420 A1 | 5/2006 | Huber et al. |
| 2006/0149407 A1 | 7/2006 | Markham et al. |
| 2007/0087946 A1 | 4/2007 | Quest et al. |
| 2007/0102278 A1 | 5/2007 | Inamasu et al. |
| 2007/0116619 A1 | 5/2007 | Taylor et al. |
| 2007/0251198 A1 | 11/2007 | Witter |
| 2008/0028935 A1 | 2/2008 | Andersson |
| 2008/0116052 A1 | 5/2008 | Eatough et al. |
| 2008/0179165 A1 | 7/2008 | Chen et al. |
| 2008/0250863 A1 | 10/2008 | Moore |
| 2008/0257236 A1 | 10/2008 | Green |
| 2008/0271985 A1 | 11/2008 | Yamasaki |
| 2008/0289305 A1 | 11/2008 | Girondi |
| 2009/0007785 A1 | 1/2009 | Kimura et al. |
| 2009/0032385 A1 | 2/2009 | Engle |
| 2009/0105852 A1 | 4/2009 | Wintrich et al. |
| 2009/0152092 A1 | 6/2009 | Kim et al. |
| 2009/0162269 A1 | 6/2009 | Barger et al. |
| 2009/0217576 A1 | 9/2009 | Kim et al. |
| 2009/0257932 A1 | 10/2009 | Canari et al. |
| 2009/0283395 A1 | 11/2009 | Hippe |
| 2010/0015564 A1 | 1/2010 | Chun et al. |
| 2010/0095521 A1 | 4/2010 | Kartal et al. |
| 2010/0106310 A1 | 4/2010 | Grohman |
| 2010/0113266 A1 | 5/2010 | Abe et al. |
| 2010/0115912 A1 | 5/2010 | Worley |
| 2010/0119425 A1 | 5/2010 | Palmer |
| 2010/0181297 A1 | 7/2010 | Whysail |
| 2010/0196597 A1 | 8/2010 | Di Loreto |
| 2010/0276269 A1 | 11/2010 | Schuecker et al. |
| 2010/0287871 A1 | 11/2010 | Bloom et al. |
| 2010/0300867 A1 | 12/2010 | Kim et al. |
| 2010/0314234 A1 | 12/2010 | Knoch et al. |
| 2011/0000284 A1 | 1/2011 | Kumar et al. |

(56) References Cited

U.S. PATENT DOCUMENTS

| | | |
|---|---|---|
| 2011/0014406 A1 | 1/2011 | Coleman et al. |
| 2011/0048917 A1 | 3/2011 | Kim et al. |
| 2011/0083314 A1 | 4/2011 | Baird |
| 2011/0088600 A1 | 4/2011 | McRae |
| 2011/0100273 A1 | 5/2011 | Ptacek |
| 2011/0120852 A1 | 5/2011 | Kim |
| 2011/0144406 A1 | 6/2011 | Masatsugu et al. |
| 2011/0156902 A1 | 6/2011 | Wang et al. |
| 2011/0168482 A1 | 7/2011 | Merchant et al. |
| 2011/0174301 A1 | 7/2011 | Haydock et al. |
| 2011/0192395 A1 | 8/2011 | Kim |
| 2011/0198206 A1 | 8/2011 | Kim et al. |
| 2011/0223088 A1 | 9/2011 | Chang et al. |
| 2011/0253521 A1 | 10/2011 | Kim |
| 2011/0291827 A1 | 12/2011 | Baldocchi et al. |
| 2011/0313218 A1 | 12/2011 | Dana |
| 2011/0315538 A1 | 12/2011 | Kim et al. |
| 2012/0031076 A1 | 2/2012 | Frank et al. |
| 2012/0125709 A1 | 5/2012 | Merchant et al. |
| 2012/0152720 A1 | 6/2012 | Reichelt et al. |
| 2012/0177541 A1 | 7/2012 | Mutsuda et al. |
| 2012/0179421 A1 | 7/2012 | Dasgupta |
| 2012/0180133 A1 | 7/2012 | Ai-Harbi et al. |
| 2012/0195815 A1 | 8/2012 | Moore et al. |
| 2012/0228115 A1 | 9/2012 | Westbrook |
| 2012/0247939 A1 | 10/2012 | Kim et al. |
| 2012/0285080 A1 | 11/2012 | Despen et al. |
| 2012/0305380 A1 | 12/2012 | Wang et al. |
| 2012/0312019 A1 | 12/2012 | Rechtman |
| 2013/0020781 A1 | 1/2013 | Kishikawa |
| 2013/0045149 A1 | 2/2013 | Miller |
| 2013/0213114 A1 | 8/2013 | Wetzig et al. |
| 2013/0216717 A1 | 8/2013 | Rago et al. |
| 2013/0220373 A1 | 8/2013 | Kim |
| 2013/0306462 A1 | 11/2013 | Kim et al. |
| 2014/0039833 A1 | 2/2014 | Sharpe, Jr. et al. |
| 2014/0156584 A1 | 6/2014 | Motukuri et al. |
| 2014/0208997 A1 | 7/2014 | Alferyev et al. |
| 2014/0224123 A1 | 8/2014 | Walters |
| 2015/0041304 A1 | 2/2015 | Kiim et al. |
| 2015/0075962 A1 | 3/2015 | Shimoyama et al. |
| 2015/0122629 A1 | 5/2015 | Freimuth et al. |
| 2015/0143908 A1 | 5/2015 | Cetinkaya |
| 2015/0175433 A1 | 6/2015 | Micka et al. |
| 2015/0176095 A1 | 6/2015 | Connors et al. |
| 2015/0219530 A1 | 8/2015 | Li et al. |
| 2015/0226499 A1 | 8/2015 | Mikkelsen |
| 2016/0026193 A1 | 1/2016 | Rhodes et al. |
| 2016/0048139 A1 | 2/2016 | Samples et al. |
| 2016/0149944 A1 | 5/2016 | Obermeirer et al. |
| 2016/0154171 A1 | 6/2016 | Kato et al. |
| 2016/0370082 A1 | 12/2016 | Olivo |
| 2016/0377430 A1 | 12/2016 | Kalagnanam et al. |
| 2017/0173519 A1 | 6/2017 | Naito |
| 2017/0182447 A1 | 6/2017 | Sappok et al. |
| 2017/0226425 A1 | 8/2017 | Kim et al. |
| 2017/0261417 A1 | 9/2017 | Zhang |
| 2017/0313943 A1 | 11/2017 | Valdevies |
| 2019/0317167 A1 | 10/2019 | LaBorde et al. |
| 2020/0071190 A1 | 3/2020 | Wiederin et al. |
| 2020/0139273 A1 | 5/2020 | Badiei |
| 2020/0173679 A1 | 6/2020 | O'Reilly et al. |
| 2020/0208063 A1 | 7/2020 | Quanci et al. |
| 2021/0198579 A1 | 7/2021 | Quanci et al. |
| 2021/0261877 A1 | 8/2021 | Despen et al. |
| 2021/0363427 A1 | 11/2021 | Quanci et al. |
| 2022/0056342 A1 | 2/2022 | Quanci et al. |
| 2022/0298423 A1 | 9/2022 | Quanci et al. |
| 2022/0356410 A1 | 11/2022 | Quanci et al. |
| 2023/0258326 A1 | 8/2023 | Quanci et al. |
| 2023/0360511 A1 | 11/2023 | Quanci et al. |
| 2023/0416629 A1 | 12/2023 | Quanci et al. |
| 2024/0059994 A1 | 2/2024 | Quanci et al. |
| 2024/0110103 A1 | 4/2024 | Quanci et al. |
| 2024/0132780 A1 | 4/2024 | Quanci et al. |
| 2024/0150659 A1 | 5/2024 | Quanci et al. |
| 2024/0150667 A1 | 5/2024 | Quanci et al. |
| 2024/0158709 A1 | 5/2024 | Quanci et al. |
| 2024/0158877 A1 | 5/2024 | Quanci et al. |
| 2024/0209265 A1 | 6/2024 | Quanci et al. |
| 2024/0229172 A1 | 7/2024 | Quanci et al. |
| 2024/0229173 A1 | 7/2024 | Quanci et al. |

FOREIGN PATENT DOCUMENTS

| | | |
|---|---|---|
| CA | 2822841 | 7/2012 |
| CA | 2822857 | 7/2012 |
| CA | 2905110 A1 | 9/2014 |
| CN | 87212113 U | 6/1988 |
| CN | 87107195 A | 7/1988 |
| CN | 2064363 U | 10/1990 |
| CN | 2139121 Y | 7/1993 |
| CN | 1092457 A | 9/1994 |
| CN | 1255528 A | 6/2000 |
| CN | 1270983 A | 10/2000 |
| CN | 2528771 Y | 2/2002 |
| CN | 1358822 A | 7/2002 |
| CN | 2521473 Y | 11/2002 |
| CN | 1468364 A | 1/2004 |
| CN | 1527872 A | 9/2004 |
| CN | 2668641 | 1/2005 |
| CN | 1957204 A | 5/2007 |
| CN | 101037603 A | 9/2007 |
| CN | 101058731 A | 10/2007 |
| CN | 101157874 A | 4/2008 |
| CN | 101211495 A | 7/2008 |
| CN | 201121178 Y | 9/2008 |
| CN | 101362971 A | 2/2009 |
| CN | 101395248 A | 3/2009 |
| CN | 100510004 C | 7/2009 |
| CN | 101486017 A | 7/2009 |
| CN | 201264981 Y | 7/2009 |
| CN | 101497835 A | 8/2009 |
| CN | 101509427 A | 8/2009 |
| CN | 101886466 A | 11/2010 |
| CN | 101910530 A | 12/2010 |
| CN | 101921643 A | 12/2010 |
| CN | 102072829 A | 5/2011 |
| CN | 102155300 A | 8/2011 |
| CN | 2509188 Y | 11/2011 |
| CN | 202226816 | 5/2012 |
| CN | 202265541 U | 6/2012 |
| CN | 102584294 A | 7/2012 |
| CN | 202415446 U | 9/2012 |
| CN | 202470353 U | 10/2012 |
| CN | 103399536 A | 11/2013 |
| CN | 103468289 A | 12/2013 |
| CN | 103468841 A | 12/2013 |
| CN | 103756699 A | 4/2014 |
| CN | 103913193 A | 7/2014 |
| CN | 203981700 U | 12/2014 |
| CN | 104498059 A | 4/2015 |
| CN | 105001914 A | 10/2015 |
| CN | 105137947 A | 12/2015 |
| CN | 105189704 A | 12/2015 |
| CN | 105264448 A | 1/2016 |
| CN | 105467949 A | 4/2016 |
| CN | 106399607 A | 2/2017 |
| CN | 106661456 A | 5/2017 |
| CN | 106687564 A | 5/2017 |
| CN | 107022359 A | 8/2017 |
| CN | 107267183 A | 10/2017 |
| CN | 107445633 A | 12/2017 |
| CN | 108219807 A | 6/2018 |
| CN | 100500619 C | 6/2020 |
| CN | 111778048 A | 10/2020 |
| CN | 113322085 A | 8/2021 |
| CN | 113462415 A | 10/2021 |
| CN | 114517099 A | 5/2022 |
| CN | 101921643 B | 12/2022 |
| DE | 201729 C | 9/1908 |
| DE | 212176 | 7/1909 |
| DE | 1212037 B | 3/1966 |
| DE | 2212544 A | 1/1973 |

(56) References Cited

FOREIGN PATENT DOCUMENTS

| | | |
|---|---|---|
| DE | 2720688 A1 | 11/1978 |
| DE | 3231697 C1 | 1/1984 |
| DE | 3328702 A1 | 2/1984 |
| DE | 3315738 C2 | 3/1984 |
| DE | 3329367 C | 11/1984 |
| DE | 3407487 C1 | 6/1985 |
| DE | 19545736 | 6/1997 |
| DE | 19803455 | 8/1999 |
| DE | 10122531 A1 | 11/2002 |
| DE | 10154785 | 5/2003 |
| DE | 102004062936 A1 | 7/2006 |
| DE | 102005015301 | 10/2006 |
| DE | 102006004669 | 8/2007 |
| DE | 102006026521 | 12/2007 |
| DE | 102009031436 | 1/2011 |
| DE | 102011052785 | 12/2012 |
| EA | 010510 B1 | 10/2008 |
| EP | 0126399 A1 | 11/1984 |
| EP | 0208490 A1 | 1/1987 |
| EP | 0903393 A2 | 3/1999 |
| EP | 1538503 A1 | 6/2005 |
| EP | 1860034 A1 | 11/2007 |
| EP | 2295129 A1 | 3/2011 |
| EP | 2468837 A1 | 6/2012 |
| FR | 2339664 | 8/1977 |
| FR | 2517802 | 6/1983 |
| FR | 2764978 | 12/1998 |
| GB | 364236 A | 1/1932 |
| GB | 368649 A | 3/1932 |
| GB | 441784 | 1/1936 |
| GB | 606340 | 8/1948 |
| GB | 611524 | 11/1948 |
| GB | 725865 | 3/1955 |
| GB | 783720 A | 9/1957 |
| GB | 871094 | 6/1961 |
| GB | 923205 A | 5/1963 |
| GB | 2000193 A | 1/1979 |
| JP | S50148405 | 11/1975 |
| JP | S5319301 A | 2/1978 |
| JP | 54054101 | 4/1979 |
| JP | S5453103 A | 4/1979 |
| JP | 57051786 | 3/1982 |
| JP | 57051787 | 3/1982 |
| JP | 57083585 | 5/1982 |
| JP | 57090092 | 6/1982 |
| JP | S57172978 A | 10/1982 |
| JP | 58091788 | 5/1983 |
| JP | 59051978 | 3/1984 |
| JP | 59053589 | 3/1984 |
| JP | 59071388 | 4/1984 |
| JP | 59108083 | 6/1984 |
| JP | 59145281 | 8/1984 |
| JP | 60004588 | 1/1985 |
| JP | 61106690 | 5/1986 |
| JP | 62011794 | 1/1987 |
| JP | 62285980 | 12/1987 |
| JP | 01103694 | 4/1989 |
| JP | 01249886 | 10/1989 |
| JP | H0319127 | 3/1991 |
| JP | 03197588 | 8/1991 |
| JP | 04159392 | 6/1992 |
| JP | H04178494 A | 6/1992 |
| JP | H05230466 A | 9/1993 |
| JP | H0649450 A | 2/1994 |
| JP | H0654753 U | 7/1994 |
| JP | H06264062 | 9/1994 |
| JP | H06299156 A | 10/1994 |
| JP | H0776713 A | 3/1995 |
| JP | 07188668 | 7/1995 |
| JP | 07216357 | 8/1995 |
| JP | H07204432 | 8/1995 |
| JP | H0843314 A | 2/1996 |
| JP | H08104875 A | 4/1996 |
| JP | 08127778 | 5/1996 |
| JP | H08218071 A | 8/1996 |
| JP | H09310074 A | 12/1997 |
| JP | H10273672 A | 10/1998 |
| JP | H11131074 | 5/1999 |
| JP | H11256166 A | 9/1999 |
| JP | 2000204373 A | 7/2000 |
| JP | 2000219883 A | 8/2000 |
| JP | 2001055576 A | 2/2001 |
| JP | 2001187887 A | 7/2001 |
| JP | 2001200258 | 7/2001 |
| JP | 2002097472 A | 4/2002 |
| JP | 2002106941 | 4/2002 |
| JP | 2003041258 | 2/2003 |
| JP | 2003051082 A | 2/2003 |
| JP | 2003071313 A | 3/2003 |
| JP | 2003292968 A | 10/2003 |
| JP | 2003342581 A | 12/2003 |
| JP | 2004169016 A | 6/2004 |
| JP | 2005503448 A | 2/2005 |
| JP | 2005135422 A | 5/2005 |
| JP | 2005154597 A | 6/2005 |
| JP | 2005263983 A | 9/2005 |
| JP | 2005344085 A | 12/2005 |
| JP | 2006188608 A | 7/2006 |
| JP | 2007063420 A | 3/2007 |
| JP | 3924064 B2 | 6/2007 |
| JP | 2007169484 A | 7/2007 |
| JP | 2007231326 A | 9/2007 |
| JP | 4101226 B2 | 6/2008 |
| JP | 2008231278 A | 10/2008 |
| JP | 2009019106 A | 1/2009 |
| JP | 2009073864 A | 4/2009 |
| JP | 2009073865 A | 4/2009 |
| JP | 2009135276 A | 6/2009 |
| JP | 2009144121 A | 7/2009 |
| JP | 2009209286 A | 9/2009 |
| JP | 2010229239 A | 10/2010 |
| JP | 2010248389 A | 11/2010 |
| JP | 2011504947 A | 2/2011 |
| JP | 2011068733 A | 4/2011 |
| JP | 2011102351 A | 5/2011 |
| JP | 2012072389 A | 4/2012 |
| JP | 2012102302 A | 5/2012 |
| JP | 2012102325 A | 5/2012 |
| JP | 2013006957 A | 1/2013 |
| JP | 2013510910 A | 3/2013 |
| JP | 2013189322 A | 9/2013 |
| JP | 2014009284 A | 1/2014 |
| JP | 2014040502 A | 3/2014 |
| JP | 2015094091 A | 5/2015 |
| JP | 2015199791 A | 11/2015 |
| JP | 2016169897 A | 9/2016 |
| JP | 2020007472 A | 1/2020 |
| KR | 1019960008754 | 10/1996 |
| KR | 19990017156 U | 5/1999 |
| KR | 1019990054426 | 7/1999 |
| KR | 20000042375 A | 7/2000 |
| KR | 100296700 B1 | 10/2001 |
| KR | 20030012458 A | 2/2003 |
| KR | 1020040020883 A | 3/2004 |
| KR | 20040107204 A | 12/2004 |
| KR | 20050053861 A | 6/2005 |
| KR | 20060132336 A | 12/2006 |
| KR | 100737393 B1 | 7/2007 |
| KR | 100797852 | 1/2008 |
| KR | 20080069170 A | 7/2008 |
| KR | 20110010452 A | 2/2011 |
| KR | 101314288 | 4/2011 |
| KR | 20120033091 A | 4/2012 |
| KR | 20130050807 | 5/2013 |
| KR | 101318388 | 10/2013 |
| KR | 20140042526 A | 4/2014 |
| KR | 20140076155 A | 6/2014 |
| KR | 20150011084 A | 1/2015 |
| KR | 20150068557 A | 6/2015 |
| KR | 20170038102 A | 4/2017 |
| KR | 20170058808 A | 5/2017 |
| KR | 20170103857 A | 9/2017 |
| KR | 101862491 B1 | 5/2018 |
| RU | 2083532 C1 | 7/1997 |

(56) References Cited

FOREIGN PATENT DOCUMENTS

| RU | 2441898 C2 | 2/2012 |
|---|---|---|
| RU | 2493233 C2 | 9/2013 |
| SU | 1535880 A1 | 1/1990 |
| TW | 201241166 A1 | 10/2012 |
| TW | 201245431 A1 | 11/2012 |
| UA | 50580 | 10/2002 |
| WO | WO9012074 | 10/1990 |
| WO | WO9945083 | 9/1999 |
| WO | WO02062922 | 8/2002 |
| WO | WO2003025093 | 3/2003 |
| WO | WO2005023649 | 3/2005 |
| WO | WO2005031297 | 4/2005 |
| WO | WO2005115583 | 12/2005 |
| WO | WO2007103649 | 9/2007 |
| WO | WO2008034424 | 3/2008 |
| WO | WO2008105269 | 9/2008 |
| WO | WO2009147983 | 12/2009 |
| WO | WO2010032734 | 3/2010 |
| WO | WO2010103992 | 9/2010 |
| WO | WO2010107513 | 9/2010 |
| WO | WO2011000447 | 1/2011 |
| WO | WO2011126043 | 10/2011 |
| WO | WO2012029979 | 3/2012 |
| WO | WO2012031726 | 3/2012 |
| WO | WO2013023872 | 2/2013 |
| WO | WO2013145679 | 10/2013 |
| WO | WO2013153557 | 10/2013 |
| WO | WO2014021909 | 2/2014 |
| WO | WO2014043667 | 3/2014 |
| WO | WO2014105064 | 7/2014 |
| WO | WO2014153050 | 9/2014 |
| WO | WO2016004106 | 1/2016 |
| WO | WO2016033511 | 3/2016 |
| WO | WO2016033515 | 3/2016 |
| WO | WO2016086322 | 6/2016 |
| WO | WO2016109854 | 7/2016 |
| WO | WO2022159604 | 7/2022 |
| WO | WO2022235839 | 11/2022 |

OTHER PUBLICATIONS

Schlueter, R. "What's so good about coke made from coal, Aug. 29, 2016," Belleview News-Democrat, Rschuleter@bnd.com; 4 pages.
Seal School, Coal v. Coke|Fast differences and Comparison. Viewable on YouTube (Year:2020).
U.S. Appl. No. 18/770,274, filed Jul. 11, 2024, Quanci et al.
"Asbestos", Virginia Department of Health, https://www.vdh.virginia.gov/environmental-health/public-health-toxicology/asbestos/, updated 2023, 2 pages.
ASTM D5341-99(2010)e1, Standard Test Method for Measuring Coke Reactivity Index (CRI) and Coke Strength After Reaction (CSR), ASTM International, West Conshohocken, PA, 2010.
Astrom, et al., "Feedback Systems: An Introduction for Scientists and Engineers," Sep. 16, 2006, available on line at http://people/duke.edu/-hpgavin/SystemID/References/Astrom-Feedback-2006.pdf ; 404 pages.
Basset et al., "Calculation of steady flow pressure loss coefficients for pipe junctions," Proc Instn Mech Engrs., vol. 215, Part C, p. 861-881 IMechIE 2001.
Beckman et al., "Possibilities and limits of cutting back coking plant output," Stahl und Eisen, Verlag Stahleisen, Dusseldorf, DE, vol. 130, No. 8, Aug. 16, 2010, pp. 57-67.
Bloom, et al., "Modular cast block—The future of coke oven repairs," Iron & Steel Technol, AIST, Warrendale, PA, vol. 4, No. 3, Mar. 1, 2007, pp. 61-64.
Boyes, Walt. (2003), Instrumentation Reference Book (3rd Edition)—34.7.4.6 Infrared and Thermal Cameras, Elsevier. Online version available at: https://app.knovel.com/hotlink/pdf/id:kt004QMGV6/instrumentation-reference-2/ditigal-video.
Item HT 56107 Briquette, 'H' Type Household or Domestic Use, SECV Brown Coal Mine, Yallourn, Victoria, circa 1925, Museums Victoria Collections, https://collections.museumsvictoria.com.au/items/2286568, published on Mar. 2, 2021; 3 pages.
"Ceramic fibers wool—to 1,300° C.", gTeek, Dec. 29, 2017 (date obtained from google search tools), https://www.gteek.com/ceramic-fibers-woolp-to1-300-%C2%B0C, 15 pages.
Chaudhari, K., Cupola Furnace, engineersgalary.com Jan. 24, 2016; 4 pages.
Clean coke process: process development studies by USS Engineers and Consultants, Inc., Wisconsin Tech Search, request date Oct. 5, 2011, 17 pages.
"Conveyor Chain Designer Guild", Mar. 27, 2014 (date obtained from wayback machine), Renold.com, Section 4, available online at: http://www.renold/com/upload/renoldswitzerland/conveyor_chain_-_designer_guide.pdf.
Costa, et al., "Edge Effects on the Flow Characteristics in a 90 deg Tee Junction," Transactions of the ASME, Nov. 2006, vol. 128, pp. 1204-1217.
Crelling, et al., "Effects of Weathered Coal on Coking Properties and Coke Quality", Fuel, 1979, vol. 58, Issue 7, pp. 542-546.
Database WPI, Week 199115, Thomson Scientific, Lond, GB; AN 1991-107552.
De Cordova, et al. "Coke oven life prolongation—A multidisciplinary approach." 10.5151/2594-357X-2610 (2015) 12 pages.
Diez, et al., "Coal for Metallurgical Coke Production: Predictions of Coke Quality and Future Requirements for Cokemaking", International Journal of Coal Geology, 2002, vol. 50, Issue 1-4, pp. 389-412.
"High Alumina Cement-Manufacture, Characteristics and Uses," TheConstructor.org, https://theconstructor.org/concrete/high-alumina-cement/23686/; 12 pages.
"How Glass Is Made," Corning, https://www.corning.com/worldwide/en/innovation/materials-science/glass/how-glass-made.html, 2 pages.
Industrial Furnace Design Handbook, Editor-in-Chief: First Design Institute of First Ministry of Machinery Industry, Beijing: Mechanical Industry Press, pp. 180-183, Oct. 1981.
Ishiwata, et al. "Effect of coke diameter and oxygen concentration of blast on cupola operation." ISIJ International, 2011, vol. 51, pp. 1353-1359.
Ivanova, V. A. "Analysis of the requirements for foundry coke." IOP Conference Series: Materials Science and Engineering, 2020, vol. 986, pp. 1-6.
Joseph, B., "A tutorial on inferential control and its applications," Proceedings of the 1999 American Control Conference (Cat. No. 99CH36251), San Diego, CA, 1999, pp. 3106-3118 vol. 5.
Kerlin, Thomas (1999), Practical Thermocouple Thermometry—1.1 the Thermocouple. ISA. Online version available at https:app.knovel.com/pdf/id:kt007XPTM3/practical-thermocouple/the-thermocouple.
Kochanski et al., "Overview of Uhde Heat Recovery Cokemaking Technology," AISTech Iron and Steel Technology Conference Proceedings, Association for Iron and Steel Technology, U.S., vol. 1, Jan. 1, 2005, pp. 25-32.
Knoerzer et al. "Jewell-Thompson Non-Recovery Cokemaking", Steel Times, Fuel & Metallurgical Journals Ltd. London, GB, vol. 221, No. 4, Apr. 1, 1993, pp. 172-173,184.
Kusiorowski, et al., "Thermal decomposition of different types of abestos," Journal of Thermal Analysis and Calorimetry • Feb. 2012, 109, 693-704 (2012).
Lin, Rongying et al., "Study on the synergistic effect of calcium and aluminum on improving ash fusion temperature of semi-coke," International Journal of Coal Preparation and Utilization, May 31, 2019 (published online), vol. 42, No. 3, pp. 556-564.
Lipunov, et al. "Diagnostics of the Heating System and Lining of Coke Ovens," Coke and Chemistry, 2014, Vopl. 57, No. 12, pp. 489-492.
Madias, et al., "A review on stamped charging of coals" (2013). Available at https://www.researchgate.net/publication/263887759_A_review_on_stamped_charging_of_coals.
Metallurgical Coke MSDS, ArcelorMittal, May 30, 2011, available online at http://dofasco.arcelormittal.com/-/media/Files/A/Arcelormittal-Canada/material-safety/metallurgical-coke.pdf.
"Middletown Coke Company HRSG Maintenance BACT Analysis Option 1—Individual Spray Quenches Sun Heat Recovery Coke (56) References Cited

OTHER PUBLICATIONS

Facility Process Flow Diagram Middletown Coke Company 100 Oven Case #1—24.5 VM", (20090901), URL: http://web.archive.org/web/20090901042738/http://epa.ohio.gov/portals/27/transfer/ptiApplication/mcc/new/262504.pdf, (Feb. 12, 2016), XP055249803 [X] 1-13 p. 7 pp. 8-11.
Office of the Federal Register, National Archives and Records Administration. (Apr. 14, 2005). 70 FR 19992—National Emission Standards for Coke Oven Batteries. [Government]. Office of the Federal Register, National Archives and Records Administration. https://www.govinfo.gov/app/details/FR-2005-04-15/05-6942.
Pearson, D.E., "Influence of Geology on CSR (Coke Strength After Reaction with C02)," 2009, 8 pages.
Practical Technical Manual of Refractories, Baoyu Hu, etc., Beijing: Metallurgical Industry Press, Chapter 6; 2004, 6-30.
Powell, et al. "Cupola Furnaces", ASM International, downloaded from http://dl.asminternational.org/handbooks/edited-volume/chapter-pdf/501030/a0005197.pdf; 9 pages.
Refractories for Ironmaking and Steelmaking: A History of Battles over High Temperatures; Kyoshi Sugita (Japan, Shaolin Zhang), 1995, p. 160, 2004, 2-29.
"Refractory Castables," Victas.com, Dec. 28, 2011 (date obtained from WayBack Machine), https://www/vitcas.com/refactory-castables; 5 pages.
Rose, Harold J., "The Selection of Coals for the Manufacture of Coke," American Institute of Mining and Metallurgical Engineers, Feb. 1926, 8 pages.
Tiwari, et al., "A novel technique for assessing the coking potential of coals/cole blends for non-recovery coke making process," Fuel, vol. 107, May 2013, pp. 615-622.
Waddell, et al., "Heat-Recovery Cokemaking Presentation," Jan. 1999, pp. 1-25.
Walker D N et al, "Sun Coke Company's heat recovery cokemaking technology high coke quality and low environmental impact", Revue De Metallurgie—Cahiers D'Informations Techniques, Revue De Metallurgie. Paris, FR, (Mar. 1, 2003), vol. 100, No. 3, ISSN 0035-1563, p. 23.
Westbrook, "Heat-Recovery Cokemaking at Sun Coke," AISE Steel Technology, Pittsburg, PA, vol. 76, No. 1, Jan. 1999, pp. 25-28.
"What is dead-band control," forum post by user "wireaddict" on AllAboutCircuits.com message board, Feb. 8, 2007, accessed Oct. 24, 2018 at https:/forum.allaboutcircuits.com/threads/what-is-dead-band-control.4728/; 8 pages.
Yu et al., "Coke Oven Production Technology," Lianoning Science and Technology Press, first edition, Apr. 2014, pp. 356-358.
"Resources and Utilization of Coking Coal in China," Mingxin Shen ed., Chemical Industry Press, first edition, Jan. 2007, pp. 242-243, 247.
Extended European Search Report for European Application No. 21799583.6; Date of Mailing: Jul. 1, 2024; 8 pages.
International Search Report and Written Opinion for PCT/US2021/030520; Date of Mailing: Sep. 16, 2021; 15 pages.
Japanese Notice of Rejection for Japanese Application No. 2022-567031; Date of Mailing: Jun. 11, 2024; 8 pages.
U.S. Appl. No. 07/587,742, filed Sep. 25, 1990, now U.S. Pat. No. 5,114,542, titled Nonrecovery Coke Oven Battery and Method of Operation.
U.S. Appl. No. 07/878,904, filed May 6, 1992, now U.S. Pat. No. 5,318,671, titled Method of Operation of Nonrecovery Coke Oven Battery.
U.S. Appl. No. 09/783,195, filed Feb. 14, 2001, now U.S. Pat. No. 6,596,128, titled Coke Oven Flue Gas Sharing.
U.S. Appl. No. 07/886,804, filed May 22, 1992, now U.S. Pat. No. 5,228,955, titled High Strength Coke Oven Wall Having Gas Flues Therein.
U.S. Appl. No. 08/059,673, filed May 12, 1993, now U.S. Pat. No. 5,447,606, titled Method of and Apparatus for Capturing Coke Oven Charging Emissions.
U.S. Appl. No. 08/914,140, filed Aug. 19, 1997, now U.S. Pat. No. 5,928,476, titled Nonrecovery Coke Oven Door.
U.S. Appl. No. 09/680,187, filed Oct. 5, 2000, now U.S. Pat. No. 6,290,494, titled Method and Apparatus for Coal Coking.
U.S. Appl. No. 10/933,866, filed Sep. 3, 2004, now U.S. Pat. No. 7,331,298, titled Coke Oven Rotary Wedge Door Latch.
U.S. Appl. No. 11/424,566, filed Jun. 16, 2006, now U.S. Pat. No. 7,497,930, titled Method and Apparatus for Compacting Coal for a Coal Coking Process.
U.S. Appl. No. 12/405,269, filed Mar. 17, 2009, now U.S. Pat. No. 7,998,316, titled Flat Push Coke Wet Quenching Apparatus and Process.
U.S. Appl. No. 13/205,960, filed Aug. 9, 2011, now U.S. Pat. No. 9,321,965, titled Flat Push Coke Wet Quenching Apparatus and Process.
U.S. Appl. No. 11/367,236, filed Mar. 3, 2006, now U.S. Pat. No. 8,152,970, titled Method and Apparatus for Producing Coke.
U.S. Appl. No. 12/403,391, filed Mar. 13, 2009, now U.S. Pat. No. 8,172,930, titled Cleanable In Situ Spark Arrestor.
U.S. Appl. No. 12/849,192, filed Aug. 3, 2010, now U.S. Pat. No. 9,200,225, titled Method and Apparatus for Compacting Coal for a Coal Coking Process.
U.S. Appl. No. 13/631,215, filed Sep. 28, 2012, now U.S. Pat. No. 9,683,740, titled Methods for Handling Coal Processing Emissions and Associated Systems and Devices.
U.S. Appl. No. 13/730,692, filed Dec. 28, 2012, now U.S. Pat. No. 9,193,913, titled Reduced Output Rate Coke Oven Operation With Gas Sharing Providing Extended Process Cycle.
U.S. Appl. No. 14/655,204, now U.S. Pat. No. 10,016,714, filed Jun. 24, 2015, titled Systems and Methods for Removing Mercury From Emissions.
U.S. Appl. No. 16/000,516, now U.S. Pat. No. 11,117,087, filed Jun. 5, 2018, titled Systems and Methods for Removing Mercury From Emissions.
U.S. Appl. No. 17/459,380, now, U.S. Pat. No. 11,845,037, filed Jun. 5, 2018, titled Systems and Methods for Removing Mercury From Emissions.
U.S. Appl. No. 13/830,971, filed Mar. 14, 2013, now U.S. Pat. No. 10,047,296, titled Non-Perpendicular Connections Between Coke Oven Uptakes and a Hot Common Tunnel, and Associated Systems and Methods, now U.S. Pat. No. 10,047,295.
U.S. Appl. No. 16/026,363, filed Jul. 3, 2018, now U.S. Pat. No. 11,008,517, titled Non-Perpendicular Connections Between Coke Oven Uptakes and a Hot Common Tunnel, and Associated Systems and Methods.
U.S. Appl. No. 13/730,796, filed Dec. 28, 2012, now U.S. Pat. No. 10,883,051, titled Methods and Systems for Improved Coke Quenching.
U.S. Appl. No. 17/140,564, filed Jan. 4, 2021, now U.S. Pat. No. 11,807,812, titled Methods and Systems for Improved Coke Quenching.
U.S. Appl. No. 13/730,598, filed Dec. 28, 2012, now U.S. Pat. No. 9,238,778, titled Systems and Methods for Improving Quenched Coke Recovery.
U.S. Appl. No. 14/952,267, filed Nov. 25, 2015, now U.S. Pat. No. 9,862,888, titled Systems and Methods for Improving Quenched Coke Recovery.
U.S. Appl. No. 15/830,320, filed Dec. 4, 2017, now U.S. Pat. No. 10,323,192, titled Systems and Methods for Improving Quenched Coke Recovery.
U.S. Appl. No. 13/730,735, filed Dec. 28, 2012, now U.S. Pat. No. 9,273,249, titled Systems and Methods for Controlling Air Distribution in a Coke Oven.
U.S. Appl. No. 14/655,013, filed Jun. 23, 2015, now U.S. Pat. No. 11,142,699, titled Vent Stack Lids and Associated Systems and Methods.
U.S. Appl. No. 17/471,491, filed Sep. 10, 2021, now U.S. Pat. No. 11,939,526, titled Vent Stack Lids and Associated Systems and Methods.
U.S. Appl. No. 13/843,166, filed Mar. 15, 2013, now U.S. Pat. No. 9,273,250, titled Methods and Systems for Improved Quench Tower Design.
U.S. Appl. No. 15/014,547, filed Feb. 3, 2016, now U.S. Pat. No. 10,927,303, titled Methods for Improved Quench Tower Design.

(56) References Cited

OTHER PUBLICATIONS

U.S. Appl. No. 17/155,818, filed Jan. 22, 2021, now U.S. Pat. No. 11,746,296, titled Methods and Systems for Improved Quench Tower Design.
U.S. Appl. No. 14/655,003, filed Jun. 23, 2015, now U.S. Pat. No. 10,760,002, titled Systems and Methods for Maintaining a Hot Car in a Coke Plant.
U.S. Appl. No. 16/897,957, filed Jun. 10, 2020, now U.S. Pat. No. 11,359,145, titled Systems and Methods for Maintaining a Hot Car in a Coke Plant.
U.S. Appl. No. 13/829,588, filed Mar. 14, 2013, now U.S. Pat. No. 9,193,915, titled Horizontal Heat Recovery Coke Ovens Having Monolith Crowns.
U.S. Appl. No. 15/322,176, filed Dec. 27, 2016, now U.S. Pat. No. 10,526,541, titled Horizontal Heat Recovery Coke Ovens Having Monolith Crowns.
U.S. Appl. No. 15/511,036, filed Mar. 14, 2017, now U.S. Pat. No. 10,968,383, titled Coke Ovens Having Monolith Component Construction.
U.S. Appl. No. 17/190,720, now U.S. Pat. No. 11,795,400, filed Mar. 3, 2021, titled Coke Ovens Having Monolith Component Construction.
U.S. Appl. No. 13/589,009, filed Aug. 17, 2012, now U.S. Pat. No. 9,359,554, titled Automatic Draft Control System for Coke Plants.
U.S. Appl. No. 15/139,568, filed Apr. 27, 2016, now U.S. Pat. No. 10,947,455, titled Automatic Draft Control System for Coke Plants.
U.S. Appl. No. 17/176,391, now U.S. Pat. No. 11,692,138, filed Feb. 16, 2021, titled Automatic Draft Control System for Coke Plants.
U.S. Appl. No. 18/321,530, filed May 22, 2023, titled Automatic Draft Control System for Coke Plants.
U.S. Appl. No. 13/588,996, filed Aug. 17, 2012, now U.S. Pat. No. 9,243,186, titled Coke Plant Including Exhaust Gas Sharing.
U.S. Appl. No. 14/959,450, filed Dec. 4, 2015, now U.S. Pat. No. 10,041,002, titled Coke Plant Including Exhaust Gas Sharing.
U.S. Appl. No. 16/047,198, filed Jul. 27, 2018, now U.S. Pat. No. 10,611,965, titled Coke Plant Including Exhaust Gas Sharing.
U.S. Appl. No. 16/828,448, filed Mar. 24, 2020, now U.S. Pat. No. 11,441,077, titled Coke Plant Including Exhaust Gas Sharing.
U.S. Appl. No. 13/589,004, filed Aug. 17, 2012, now U.S. Pat. No. 9,249,357, titled Method and Apparatus for Volatile Matter Sharing in Stamp-Charged Coke Ovens.
U.S. Appl. No. 13/730,673, filed Dec. 28, 2012, now U.S. Pat. No. 9,476,547, titled Exhaust Flow Modifier, Duct Intersection Incorporating the Same, and Methods Therefor.
U.S. Appl. No. 15/281,891, filed Sep. 30, 2016, now U.S. Pat. No. 10,975,309, titled Exhaust Flow Modifier, Duck Intersection Incorporating the Same, and Methods Therefor.
U.S. Appl. No. 17/191,119, filed Mar. 3, 3021, titled Exhaust Flow Modifier, Duck Intersection Incorporating the Same, and Methods Therefor.
U.S. Appl. No. 13/598,394, filed Aug. 29, 2012, now U.S. Pat. No. 9,169,439, titled Method and Apparatus for Testing Coal Coking Properties.
U.S. Appl. No. 14/865,581, filed Sep. 25, 2015, now U.S. Pat. No. 10,053,627, titled Method and Apparatus for Testing Coal Coking Properties, now U.S. Pat. No. 10,053,627.
U.S. Appl. No. 14/839,384, filed Aug. 28, 2015, now U.S. Pat. No. 9,580,656, titled Coke Oven Charging System.
U.S. Appl. No. 15/443,246, filed Feb. 27, 2017, now U.S. Pat. No. 9,976,089, titled Coke Oven Charging System.
U.S. Appl. No. 14/587,670, filed Dec. 31, 2014, now U.S. Pat. No. 10,619,101, titled Methods for Decarbonizing Coking Ovens, and Associated Systems and Devices.
U.S. Appl. No. 16/845,530, filed Apr. 10, 2020, now U.S. Pat. No. 11,359,146, titled Methods for Decarbonizing Coking Ovens, and Associated Systems and Devices.
U.S. Appl. No. 14/984,489, filed Dec. 30, 2015, now U.S. Pat. No. 10,975,310, titled Multi-Modal Beds of Coking Material.
U.S. Appl. No. 14/983,837, filed Dec. 30, 2015, now U.S. Pat. No. 10,968,395, titled Multi-Modal Beds of Coking Material.
U.S. Appl. No. 14/986,281, filed Dec. 31, 2015, now U.S. Pat. No. 10,975,311, titled Multi-Modal Beds of Coking Material.
U.S. Appl. No. 17/222,886, filed Apr. 12, 2021, titled Multi-Modal Beds of Coking Material.
U.S. Appl. No. 14/987,625, filed Jan. 4, 2016, now U.S. Pat. No. 11,060,032, titled Integrated Coke Plant Automation and Optimization Using Advanced Control and Optimization Techniques.
U.S. Appl. No. 17/172,476, filed Feb. 10, 2021, now U.S. Pat. No. 11,788,012, titled Integrated Coke Plant Automation and Optimization Using Advanced Control and Optimization Techniques.
U.S. Appl. No. 14/839,493, filed Aug. 28, 2015, now U.S. Pat. No. 10,233,392, titled Method and System for Optimizing Coke Plant Operation and Output.
U.S. Appl. No. 16/251,352, filed Jan. 18, 2019, now U.S. Pat. No. 11,053,444, titled Method and System for Optimizing Coke Plant Operation and Output.
U.S. Appl. No. 14/839,551, filed Aug. 28, 2015, now U.S. Pat. No. 10,308,876, titled Burn Profiles for Coke Operations.
U.S. Appl. No. 16/428,014, filed May 31, 2019, now U.S. Pat. No. 10,920,148, titled Improved Burn Profiles for Coke Operations.
U.S. Appl. No. 17/155,719, filed Jan. 22, 2021, now U.S. Pat. No. 11,441,078, titled Improved Burn Profiles for Coke Operations.
U.S. Appl. No. 14/839,588, filed Aug. 28, 2015, now U.S. Pat. No. 9,708,542, titled Method and System for Optimizing Coke Plant Operation and Output.
U.S. Appl. No. 15/392,942, filed Dec. 28, 2016, now U.S. Pat. No. 10,526,542, titled Method and System for Dynamically Charging a Coke Oven.
U.S. Appl. No. 16/735,103, filed Jan. 6, 2020, now U.S. Pat. No. 11,214,739, titled Method and System for Dynamically Charging a Coke Oven.
U.S. Appl. No. 15/614,525, filed Jun. 5, 2017, now U.S. Pat. No. 11,508,230, titled Methods and Systems for Automatically Generating a Remedial Action in an Industrial Facility.
U.S. Appl. No. 18/047,916, filed Oct. 19, 2022, titled Methods and Systems for Automatically Generating a Remedial Action in an Industrial Facility.
U.S. Appl. No. 15/987,860, filed May 23, 2018, now U.S. Pat. No. 10,851,306, titled System and Method for Repairing a Coke Oven.
U.S. Appl. No. 17/076,563, filed Oct. 21, 2020, now U.S. Pat. No. 11,186,778, titled System and Method for Repairing a Coke Oven.
U.S. Appl. No. 17/521,061, now U.S. Pat. No. 11,845,898, filed Nov. 8, 2021, titled System and Method for Repairing a Coke Oven.
U.S. Appl. No. 17/135,483, filed Dec. 28, 2020, titled Oven Health Optimization Systems and Methods.
U.S. Appl. No. 16/729,053, filed Dec. 27, 2019, now U.S. Pat. No. 11,760,937, titled Oven Uptakes.
U.S. Appl. No. 16/729,036, filed Dec. 27, 2019, now U.S. Pat. No. 11,365,355, titled Systems and Methods for Treating a Surface of a Coke Plant.
U.S. Appl. No. 17/747,708, filed May 18, 2022, now U.S. Pat. No. 12,060,525, titled Systems and Methods for Treating a Surface of a Coke Plant.
U.S. Appl. No. 18/770,264, filed Jul. 11, 2024, titled Systems and Methods for Treating a Surface of a Coke Plant.
U.S. Appl. No. 16/729,201, filed Dec. 27, 2019, titled Gaseous Tracer Leak Detection.
U.S. Appl. No. 16/729,122, filed Dec. 27, 2019, now U.S. Pat. No. 11,395,989, titled Methods and Systems for Providing Corrosion Resistant Surfaces in Contaminant Treatment Systems.
U.S. Appl. No. 17/843,164, filed Jun. 17, 2022, now U.S. Pat. No. 11,819,802, titled Methods and Systems for Providing Corrosion Resistant Surfaces in Contaminant Treatment Systems.
U.S. Appl. No. 16/729,068, filed Dec. 27, 2019, now U.S. Pat. No. 11,486,572, titled Systems and Methods for Utilizing Flue Gas.
U.S. Appl. No. 17/947,520, filed Sep. 19, 2022, titled Systems and Methods for Utilizing Flue Gas.
U.S. Appl. No. 16/729,129, filed Dec. 27, 2019, now U.S. Pat. No. 11,008,518, titled Coke Plant Tunnel Repair and Flexible Joints.
U.S. Appl. No. 17/320,343, filed May 14, 2021, now U.S. Pat. No. 11,597,881, titled Coke Plant Tunnel Repair and Flexible Joints.
U.S. Appl. No. 18/168,142, filed Feb. 13, 2023, titled Coke Plant Tunnel Repair and Flexible Joints.

(56) References Cited

OTHER PUBLICATIONS

U.S. Appl. No. 16/729,170, now U.S. Pat. No. 11,193,069, filed Dec. 27, 2019, titled Coke Plant Tunnel Repair and Anchor Distribution.
U.S. Appl. No. 17/532,058, now U.S. Pat. No. 11,505,747, filed Nov. 22, 2021, titled Coke Plant Tunnel Repair and Anchor Distribution.
U.S. Appl. No. 17/967,615, filed Oct. 17, 2022, titled Coke Plant Tunnel Repair and Anchor Distribution.
U.S. Appl. No. 16/729,157, filed Dec. 27, 2019, now U.S. Pat. No. 11,071,935, titled Particulate Detection for Industrial Facilities, and Associated Systems and Methods.
U.S. Appl. No. 16/729,057, filed Dec. 27, 2019, now U.S. Pat. No. 11,021,655, titled Decarbonization of Coke Ovens and Associated Systems and Methods.
U.S. Appl. No. 17/321,857, filed May 17, 2021, now U.S. Pat. No. 11,643,602, titled Decarbonization of Coke Ovens and Associated Systems and Methods.
U.S. Appl. No. 18/313,622, filed May 8, 2023, titled Decarbonization of Coke Ovens and Associated Systems and Methods.
U.S. Appl. No. 16/729,212, filed Dec. 27, 2019, now U.S. Pat. No. 11,261,381, titled Heat Recovery Oven Foundation.
U.S. Appl. No. 17/584,672, now U.S. Pat. No. 11,845,897, filed Jan. 26, 2022, titled Heat Recovery Oven Foundation.
U.S. Appl. No. 18/492,913, filed Oct. 24, 2023, titled Heat Recovery Oven Foundation.
U.S. Appl. No. 16/729,219, now U.S. Pat. No. 11,098,252, filed Dec. 27, 2019, titled Spring-Loaded Heat Recovery Oven System and Method.
U.S. Appl. No. 17/388,874, filed Jul. 29, 2021, now, U.S. Pat. No. 11,680,208, titled Spring-Loaded Heat Recovery Oven System and Method.
U.S. Appl. No. 17/736,960, filed May 20, 2022, titled Foundry Coke Products, and Associated Systems and Methods.
U.S. Appl. No. 17/306,895, now U.S. Pat. No. 11,767,482, filed May 3, 2021, now U.S. Pat. No. 11,767,482, titled High-Quality Coke Products.
U.S. Appl. No. 18/363,465, filed Aug. 1, 2023, titled High-Quality Coke Products.
U.S. Appl. No. 18/466,549, filed Sep. 13, 2023, titled High-Quality Coke Products.
U.S. Appl. No. 18/501,488, filed Nov. 3, 2023, titled Coal Blends, Foundry Coke Products, and Associated Systems, Devices, and Methods.
U.S. Appl. No. 18/501,795, filed Nov. 3, 2023, titled Coal Blends, Foundry Coke Products, and Associated Systems, Devices, and Methods.
U.S. Appl. No. 18/052,739, filed Nov. 4, 2022, now U.S. Pat. No. 11,946,108, titled Foundry Coke Products and Associated Processing Methods via Cupolas.
U.S. Appl. No. 18/586,236, filed Feb. 23, 2024, titled Foundry Coke Products and Associated Processing Methods via Cupolas.
U.S. Appl. No. 18/052,760, filed Nov. 2, 2022, now U.S. Pat. No. 11,851,724, titled Foundry Coke Products, and Associated Systems, Devices, and Methods.
U.S. Appl. No. 18/506,746, filed Nov. 10, 2023, titled Foundry Coke Products, and Associated Systems, Devices, and Methods.
U.S. Appl. No. 18/892,228, filed Sep. 20, 2024, titled Foundry Coke Products, and Associated Systems, Devices, and Methods.
U.S. Appl. No. 18/511,148, filed Nov. 16, 2023, titled Products Comprising Char and Carbon, and Associated Systems, Devices, and Methods.
U.S. Appl. No. 18/511,621, filed Nov. 16, 2023, titled Pelletized Products and Associated Systems, Devices, and Methods.

\* cited by examiner

| p (bulk Density) lb/ft3 | bottom screen size (in) | | | | | | |
|---|---|---|---|---|---|---|---|
| | 1 | 2 | 3 | 3.5 | 4 | 5 | 6 |
| | Rh (Hydraulic Radius) | | | | | | |
| 25 | 1.27 | 1.64 | 1.98 | 2.15 | 2.32 | 2.66 | 2.99 |
| 26 | 1.18 | 1.53 | 1.85 | 2.01 | 2.17 | 2.48 | 2.79 |
| 27 | 1.11 | 1.43 | 1.73 | 1.88 | 2.03 | 2.32 | 2.61 |
| 28 | 1.04 | 1.33 | 1.62 | 1.76 | 1.89 | 2.17 | 2.44 |
| 29 | 0.97 | 1.25 | 1.51 | 1.64 | 1.77 | 2.03 | 2.28 |
| 30 | 0.91 | 1.17 | 1.42 | 1.54 | 1.66 | 1.90 | 2.13 |
| 31 | 0.85 | 1.09 | 1.32 | 1.44 | 1.55 | 1.77 | 2.00 |
| 32 | 0.79 | 1.02 | 1.24 | 1.34 | 1.45 | 1.66 | 1.87 |
| 33 | 0.74 | 0.95 | 1.16 | 1.26 | 1.36 | 1.55 | 1.75 |
| 34 | 0.69 | 0.89 | 1.08 | 1.17 | 1.27 | 1.45 | 1.63 |
| 35 | 0.65 | 0.83 | 1.01 | 1.10 | 1.18 | 1.35 | 1.52 |

HIGH-QUALITY COKE PRODUCTS

CROSS-REFERENCE TO RELATED APPLICATIONS

This application is a continuation of U.S. patent application Ser. No. 18/466,549, filed Sep. 13, 2023, which is a continuation of U.S. patent application Ser. No. 17/306,895, filed May 3, 2021 (now U.S. Pat. No. 11,767,482), which claims priority to U.S. Provisional Application No. 63/019,405, filed on May 3, 2020, the disclosures of which are each incorporated herein by reference in their entireties.

TECHNICAL FIELD

This disclosure relates to high quality coke products having unique properties made in ovens including horizontal ovens such as heat recovery, non-recovery or Thompson ovens.

BACKGROUND

Coke is a solid carbon fuel and carbon source used to melt and reduce iron ore in the production of steel. Foundry coke is coke of very large size, usually at least 4 inches in diameter, and of exceptional quality such as very low content of impurities, and very high carbon content, strength, and stability. Foundry coke is used in foundry cupolas to melt iron and produce cast iron and ductile iron products. However, the production cost including the manufacturing cost, transportation cost, and environmental cost, for foundry coke is high. Therefore, there is a need in the art to improve the production process thereby to obtain high quality foundry coke at a higher yield and/or a lower cost. This application satisfies the need by providing a high-quality foundry coke with many unique and improved properties.

BRIEF DESCRIPTION OF THE DRAWINGS

This application contains at least one drawing executed in color. Copies of this application with color drawing(s) will be provided by the Office upon request and payment of the necessary fees.

FIG. 5 shows an example of the calculation of hydraulic radius and an example of user's output of the calculation.

DETAILED DESCRIPTION

Disclosed herein are high quality HD+™ coke products, in particular, HD+™ foundry coke having unique properties. The coking process produces coke products of various sizes in different fractions. Conventionally, the coke products have a substantially round shape and are classified based on size: foundry coke having a size of larger than 4 inches in diameter, egg (industrial coke) having a size of 2-4 inches, stove having a size of 1-2 inches or 1-1.5 inches, nut having a size of ⅜-1 inch, and breeze having a size of less than ⅜ inch. According to aspects of this disclosure, the HD+™ coke products disclosed herein are produced by a proprietary coking process using a predetermined coal blend including certain percentage of inerts or breeze in a horizontal oven such as a heat recovery oven, a non-recovery oven, or a Thompson oven. The HD+™ coke products can be classified differently. In one example, the HD+™ coke products include HD+™ foundry coke having a hydraulic diameter of over 3.5 inches, HD+™ egg coke having a hydraulic diameter of 1.5-3.5 inches, HD+™ breeze having a hydraulic diameter of 0.5-1.5 inches, and HD+™ waste fines having a size of less than 0.5 inch. All HD+™ breeze can be crushed to less than ⅜ inch and recycled to coal blend for the coking process, while waste fines may impose an issue with heat recovery due to potential burn loss and high ash content. Therefore, some or all waste fines are recycled depending on the coking process. HD+™ eggs are only recycled if additional breeze loading is required but mostly, HD+™ eggs can be sold and used in sugar beet and mineral wool or rock wool production.

Figure 1:
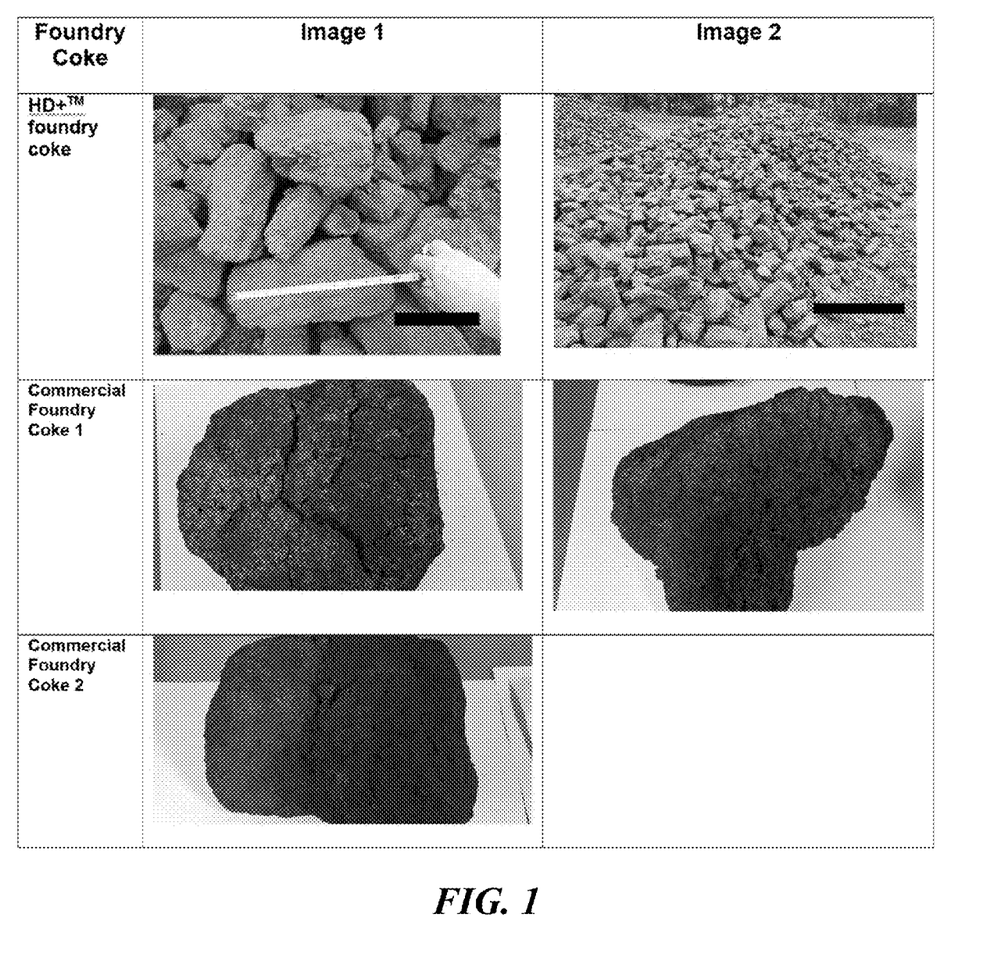
FIG. 1 shows the shape, size, and color of HD+™ foundry coke produced with 10% wt breeze in comparison with commercially available foundry coke. Commercial foundry coke 1 is made in the USA in a conventional byproduct plant, shown on a piece of 8.5 inches×11 inches paper. Commercial foundry coke 2 has extremely high density and is made in a foreign country in a stamp charged byproduct plant, shown on a piece of 8.5 inches×11 inches paper.

In certain embodiments, disclosed herein is HD+™ coke having a shape distinguishable from commercially available foundry coke, which has a substantially round shape and a diameter of at least 4 inches. Unlike the conventional round-shaped, black foundry coke, the HD+™ foundry coke disclosed herein has an oblong "finger-shape", as shown in FIG. 1. In certain embodiments, the HD+™ coke disclosed herein has a gray or light gray color.

In certain embodiments, the HD+™ foundry coke has a high aspect ratio of length to width. For example, the HD+™ foundry coke has a length between 2 and 36 inches, between 3 and 15 inches, between 4 and 12 inches, or between 4 and 10 inches and a width between 1.5 and 12 inches, between 2 and 8 inches, between 3 and 7 inches, between 2 and 4 inches, or between 4 and 6 inches. In some embodiments, the HD+™ foundry coke has a length of at least 2 inches, at least 3 inches, at least 4 inches, at least 5 inches, at least 6 inches, at least 7 inches, at least 8 inches, at least 9 inches, at least 10 inches, at least 11 inches, at least 12 inches, at least 13 inches, at least 14 inches, at least 15 inches, at least 16 inches, at least 17 inches, at least 18 inches, at least 19 inches, at 20 inches, at least 21 inches, at least 22 inches, at least 23 inches, at least 24 inches, at least 25 inches, at least 26 inches, at least 27 inches, at least 28 inches, at least 29 inches, at least 30 inches, at least 31 inches, at least 32 inches, at least 33 inches, at least 34 inches, at least 35 inches, or at least 36 inches. In some embodiments, the HD+™ foundry coke has a width of at least 1.5 inches, at least 2 inches, at least 3 inches, at least 4 inches, at least 5 inches, at least 6 inches, at least 7 inches, at least 8 inches, at least 9 inches, at least 10 inches, at least 11 inches, at least 12 inches, at least 13 inches, at least 14 inches, at least 15 inches, at least 16 inches, at least 17 inches, at least 18 inches. In certain embodiments, the HD+™ foundry coke has a length:width ratio of at least 1.1, at least 1.5, at least 2.0, at least 2.5, at least 3.0, at least 3.5, at least 4.0, at least 4.5, at least 5.0, at least 5.5, at least 6.0, at least 6.5, at least 7.0, at least 7.5, at least 8.0, at least 8.5, at least 9.0, at least 9.5, or at least 10.0. In some embodiments, the HD+™ foundry coke has a length:width ratio of at least 2.0, at least 3.0, or at least 4.0.

In certain embodiments, the HD+™ foundry coke is produced in a horizontal oven such as a heat recovery, non-recovery or Thompson oven by a proprietary process. In certain embodiments, at least 30%, at least 35%, at least 40%, at least 45%, at least 50%, at least 55%, at least 60%, at least 65%, at least 70%, at least 75%, at least 80%, at least 85%, at least 90%, at least 95%, at least 98%, or at least 99% of the total coke from a single production process or a single oven falls within the ranges of the length, width, and the ratio of length:width disclosed above. In certain embodiments, at least 40%, at least 45%, at least 50%, at least 55%, at least 60%, at least 65%, at least 70%, at least 75%, at least 80%, at least 85%, at least 90%, at least 95%, at least 98%, or at least 99% of the total foundry coke from a single production process falls or a single oven within the ranges of the length, width, and the ratio of length:width disclosed above.

In certain embodiments, the HD+™ foundry coke has a hydraulic diameter (Dh) larger than its actual or effective diameter; whereas the conventional round-shaped foundry coke has a Dh substantially the same as the actual diameter. Dh is a function of hydraulic radius (Rh), which is defined as follows:

$$Rh = \frac{\varepsilon b D p}{6(1 - \varepsilon b)}$$

εb is the interparticle porosity of the coke bed, calculated as follows:

$$\varepsilon b = 1 - \frac{\rho b}{\rho a}$$

where ρb is the bulk density and ρa is the apparent density of coke.

Dp is the harmonic mean particle diameter. Dp represents the size of a uniform coke that has the same surface-to-volume ratio as a nonuniform coke, calculated as follows:

$$Dp = \frac{1}{\sum_i \frac{fi}{Di}}$$

where fi is the weight fraction of the coke charge having a diameter Di. For uniform size coke, Dp=Di.

In certain embodiments, the HD+™ foundry coke has a hydraulic diameter of at least 2 inches, at least 2.5 inches, at least 3 inches, at least 3.5 inches, at least 4 inches, at least 4.5 inches, at least 5 inches, at least 5.5 inches, at least 6 inches, at least 6.5 inches, at least 7 inches, at least 7.5 inches, at least 8 inches, at least 8.5 inches, at least 9 inches, at least 9.5 inches, at least 10 inches, at least 10.5 inches, at least 11 inches, at least 11.5 inches, at least 12 inches, at least 12.5 inches, at least 13 inches, at least 13.5 inches, at least 14 inches, at least 14.5 inches, at least 15 inches, at least 15.5 inches, at least 16 inches, at least 16.5 inches, at least 17 inches, at least 17.5 inches, or at least 18 inches. In certain embodiments, the HD+™ egg has a hydraulic diameter of between 1.5 and 3.5 inches or between 1.5 and 2 inches.

Figure 2:
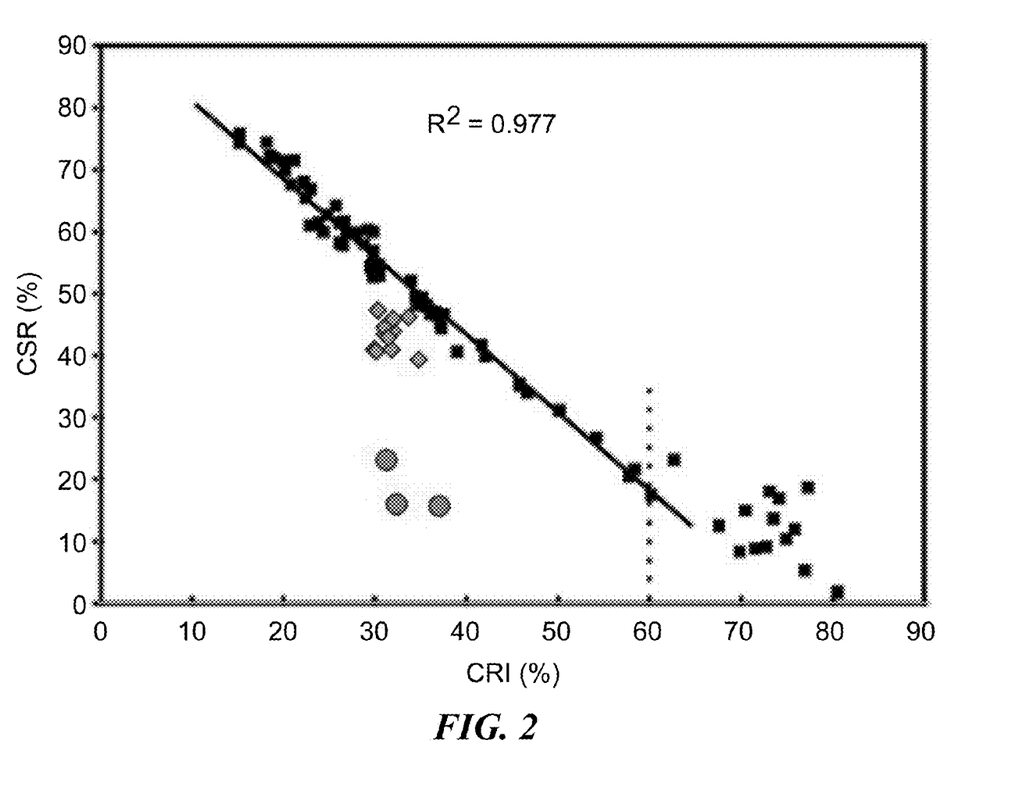
FIG. 2 shows the CSR and CRI of HD+™ foundry coke obtained at 5% wt breeze loading (diamonds) and at 8.5% wt breeze loading (circles) in comparison to the CSR and CRI for regular Met Coke (squares) from literature (Díez et al., *International Journal of Coal Geology* 50:389-412 (2002)).

Coke Reactivity Index (CRI) represents the percentage of weight loss after Boudouard reaction: $CO_2 + C_{(coke)} = 2CO$ in heated kiln for 2 hours. Coke Strength after Reaction (CSR) is based on a tumble strength test of coke remaining after the CRI kiln reaction. Boudouard reaction occurring at the surface of foundry coke in a cupola is undesirable because the reaction steals heat from iron melting and makes the process less efficient. Thus, a lower CRI is desirable such that the coke is inert enough to resist the Boudouard reaction. On the other hand, the CRI cannot be too low such that the coke is inert to resist combustion. As shown in FIG. 2, CSR and CRI has an inverse correlation. The conventional foundry coke has a CSR of between 10% and 15%, which correlates to a high CRI of at least 60%.

Unless specified otherwise, all percentages disclosed in this document refer to weight percentage. In certain embodiments, the HD+™ foundry coke disclosed herein has a CSR between 5% and 60%, between 5% and 50%, between 15% and 50%, or between 15% and 40%. In certain embodiments, the HD+™ coke has a CRI less than 40%, between 20% and 45%, between 25% and 40%, or between 31% and 37%. The percentage of breeze loading during the coking process affects the CSR of the HD+™ coke, where a higher breeze loading results in a decrease in CSR, shown in FIG. 2. According to aspects of the disclosure, CRI remains low even when CSR is significantly increased. According to one embodiment of the disclosure, HD+™ coke disclosed herein has a combination of a low CRI such as between 25% and 40% and a mid- to high-range CSR such as between 15% and 50%.

In certain embodiments, the HD+™ egg has the same or substantially the same CSR as the HD+™ foundry coke disclosed above. In certain embodiments, the HD+™ egg has the same or substantially the same CRI as the HD+™ foundry coke disclosed above.

After production from the oven, the HD+™ foundry coke is subject to quality control and screening before shipping and delivering to a customer. As used herein, the term "pre-processed" coke products means that the coke products are freshly produced from the oven and before screening, shipping and delivering to a customer; while the term "processed" coke products means that the coke products have been subjected to the process of screening, shipping, and delivering to a customer. In certain embodiments, the pre-processed HD+™ foundry coke has a 4-inch drop shatter of at least 30%, at least 35%, at least 40%, at least 45%, at least 50%, at least 55%, at least 60%, at least 65%, at least 70%, at least 75%, at least 80%, at least 85%, or at least 90% when using starting materials having a size of at least 4 inches for the industry standard drop shatter test. In certain embodiments, the pre-processed HD+™ foundry coke has a 2-inch drop shatter of at least 40%, at least 45%, at least 50%, at least 55%, at least 60%, at least 65%, at least 70%, at least 75%, at least 80%, at least 85%, at least 90%, or at least 95% when using starting materials having a size of at least 4 inches for the industry standard drop shatter test. In certain embodiments, the processed HD+™ foundry coke has a 4-inch drop shatter of at least 60%, at least 65%, at least 70%, at least 75%, at least 80%, at least 85%, or at least 90% when using starting materials having a size of at least 4 inches for the industry standard drop shatter test. In certain embodiments, the processed HD+™ foundry coke has a 2-inch drop shatter of at least 80%, at least 85%, at least 90%, or at least 95% when using starting materials having a size of at least 4 inches for the industry standard drop shatter test.

In certain embodiments, the HD+™ foundry coke has one or more customized references, such as an ash content of between 5% and 12%, less than 10%, less than 9.5%, less than 9%, less than 8.5%, less than 8%, less than 7.5%, or less than 7%; a sulfur content of less than 1%, less than 0.9%, less than 0.8%, less than 0.7%, less than 0.6%, or less than 0.5%; a volatile matter (VM) content of less than 2%, less than 1%, between 0.4% and 1%, about 0.5%, or about 0.3%; a moisture content of less than 15%, less than 10%, less than 9%, less than 8%, less than 7%, less than 6%, less than 5%, less than 4%, less than 3%, less than 2%, less than 1%, or between 1% and 10%; and a fixed carbon content of at least 80%, at least 85%, at least 90%, or at least 95%.

In certain embodiments, the total coke produced by the proprietary process has a size distribution as follows: the HD+™ foundry coke is at least 40%, at least 45%, at least 50%, at least 55%, at least 60%, at least 65%, at least 70%, at least 75%, or at least 80%, the mid-size coke including the HD+™ egg and HD+™ breeze is between 5% and 35%, between 10% and 30%, or between 15% and 20%, the waste fines is less than 10%, less than 8%, or less than 5%. Preferably, the fraction of HD+™ foundry coke is at a highest possible percentage in the total coke produced.

Due to its unique size and shape, the HD+™ coke disclosed herein has an advantage of achieving a desirable packing density as demonstrated in the working example below.

Example 1: Packing Test

This example demonstrates a cupola packing simulation by a simplistic 2D random packing model. Comparing to the uniformly sized coke, coke having a wide size distribution is expected to have a higher bulk density, greater surface area, and lower bed porosity when loaded in an oven.

Figure 3A:
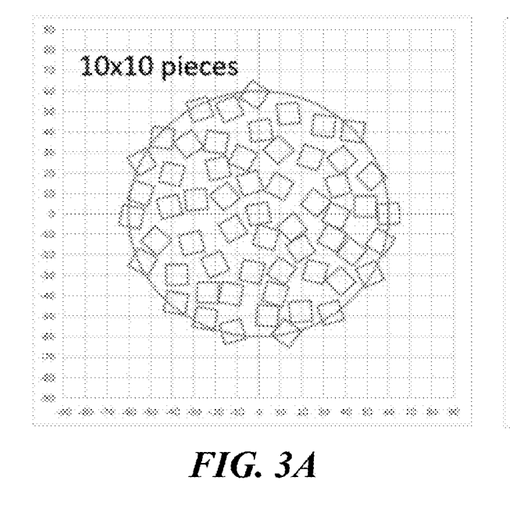
FIGS. 3A-3C show the simulation of packing tests for coke pieces having a uniform size of (10 inches×10 inches) (FIG. 3A), coke pieces having a uniform size of (4 inches×10 inches) (FIG. 3B), and coke pieces having random sizes (FIG. 3C).

FIG. 3A shows a 2D simulated packing test of coke having a uniform size of 10 inches×10 inches. The circle represents the cross section of a cupola with a radius of 60 inches. Each of the squares represents a piece of foundry coke that is a cube 10 inches on a side. The coke pieces were sequentially attempted to be added in in random locations and with random rotations. If the new coke piece did not overlap with any previous pieces, then it was placed and otherwise discarded. Overlap was determined by the intersection of coke edges. In this particular simulation 10,000 pieces were attempted and only 61 were able to fit in.

The gross assumptions for this model include: (1) the next layer of pieces lays on top of this one; (2) the parts of the coke pieces that extend outside of the circle are ignored as a trivial error; (3) this cross-section is essentially equivalent to any other cross section in the cupola; (4) the relative density of the coke loading is proportional to the ratio of the sum of the areas of the squares to the area of the total circle; and (5) although not exactly accurate, the relative surface area is roughly proportional to the sum of perimeters of the coke pieces.

Figure 3B:
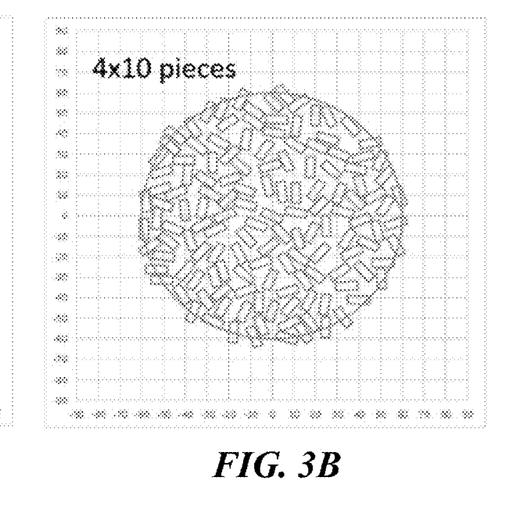

In a side-by-side comparison of fitting 10 inches×10 inches pieces (illustrated in FIG. 3A) and 4 inches×10 inches pieces (illustrated in FIG. 3B), the ratio of the covered area and the sum of perimeters of the coke pieces are compared. For the 10 inches×10 inches pieces, 58 pieces were placed, resulting in a 51% coverage of the cupola area of 11,309 square inches: (10×10×58)/11,309=51%; and a sum of perimeters of 2,320 inches: 2×(10+10)×58=2,320. For the 4 inches×10 inches pieces, 138 pieces were placed, resulting in a 49% coverage of the cupola area of 11,309 square inches: (4×10×138)/11,309=49%; and a sum of perimeters of 3,864 inches: 2×(4+10)×138=3,864.

The next improvement in the simulation was to: (1) Allow variation in the length and width of the coke pieces between a user defined maximum and minimum. Each piece is assumed have a square small end (i.e. L×W×W); and (2) Allow for the piece to tilt so smaller "corners" of the piece can fit in the allowed spaces. When full range of tilt was allowed, the simulation favored standing the pieces on small end. Therefore, the maximum tilt was limited to 30 degrees arbitrarily.

Figure 3C:
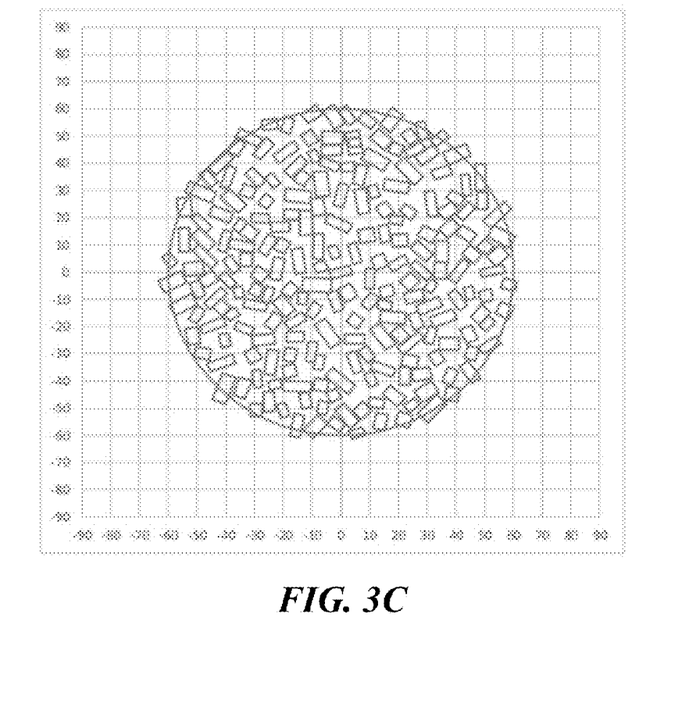

Based on this assumption, coke pieces of various sizes were fitted to cupola radius of 60 inches as shown in FIG. 3C. The coke pieces have a length between 4 inches and 10 inches and a width between 3 inches and 5 inches, and 10,000 attempts were made for the fitting. For the pieces of various sizes, 209 pieces were placed, resulting in a 47% coverage of the cupola area of 11,309 square inches: 5,365/11,309=47%; and a sum of perimeters of 4,383 inches. Therefore, the packing test demonstrates that the relative density of the coke loading did not change significantly, while the relative surface area increased significantly comparing the packing simulations in FIGS. 3A-C. The results are summarized in Table 1 below.

TABLE 1

Coke Pieces Packing Test Results

| Coke Size | % of coverage area (packing density) | Sum of perimeters (relative surface area) |
| --- | --- | --- |
| A (10 inches × 10 inches) | 51% | 2320 |
| B (4 inches × 10 inches) | 49% | 3864 |
| C ([3-5 inches] × [4-10 inches]) | 47% | 4383 |

Figure 4:
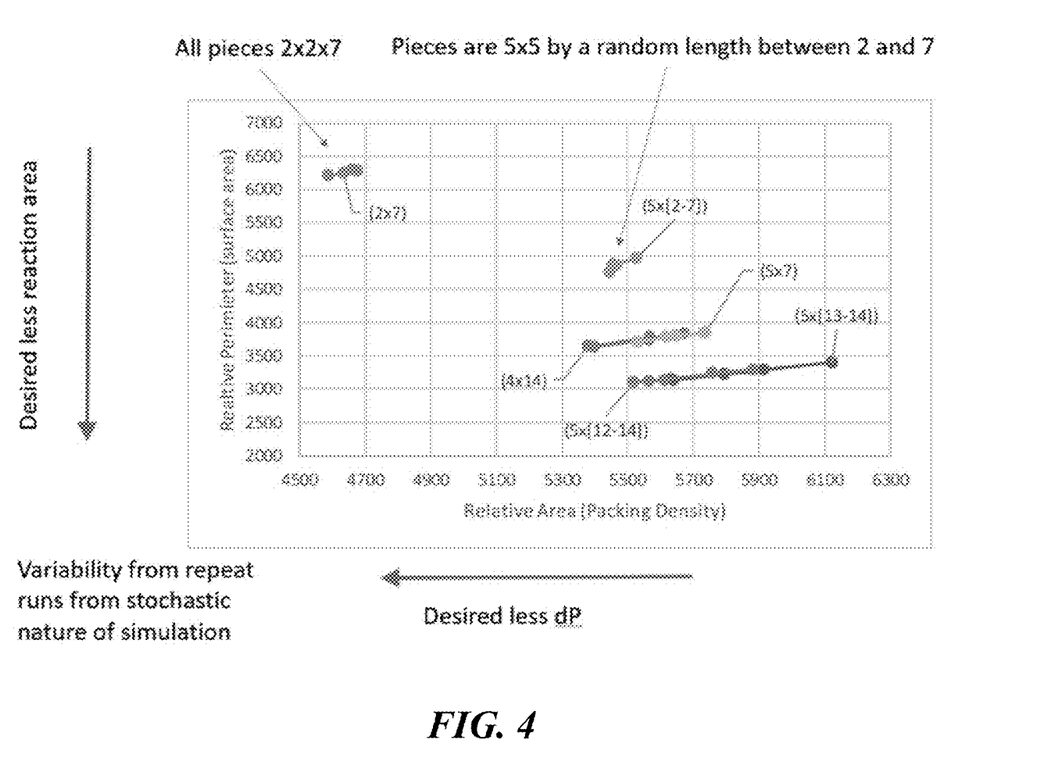
FIG. 4 shows variability from repeat runs from stochastic nature of simulation in packing tests for cupola.

FIG. 4 shows variability from repeat runs from stochastic nature of simulation.

Example 2: Calculation of Hydraulic Radius

An Excel model was used to calculate hydraulic radius of the foundry coke based on its measured size distribution, the presumed bottom screen cut and the bulk density using the formulas disclosed above.

The oblong shape of our coke has the potential to create a sparse packing density which in turn increases the effective hydraulic radius. This in turn makes the cupola performance of the foundry improve due to the reduction of latent heat loss from the reaction of $CO_2$ and coke to form CO which occurs on the surface of the coke. Higher interstitial volume to coke surface area ratios help on this factor.

Hydraulic radius can also be improved by cutting out the small coke but the yield will be compromised. The oblong coke shape may prove to be a significant cupola performance benefit.

The bulk density of the screened coke, as well as unscreened coke, is measured and can be used in the calculation. The calculation results are shown in FIG. 5.

From the foregoing it will be appreciated that, although specific embodiments of the technology have been described herein for purposes of illustration, various modifications may be made without deviating from the spirit and scope of the technology. Further, certain aspects of the new technology described in the context of particular embodiments may be combined or eliminated in other embodiments. Moreover, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein. Thus, the disclosure is not limited except as by the appended claims.

We claim:

1. A coke comprising a Coke Reactivity Index (CRI) between 20 and 45%, a fixed carbon content of at least 80%, and a sulfur content less than 1.0%.

2. The coke of claim 1, further comprising a Coke Strength after Reaction (CSR) between 15% and 40%.

3. The coke of claim 1, further comprising a length:width ratio of at least 1.1.

4. The coke of claim 1, wherein the CRI is between 25 and 45%.

5. The coke of claim 1, wherein the coke has a 4-inch drop shatter of at least 60% when using a starting material having a size of at least 4 inches in a drop shatter test.

6. The coke of claim 1, wherein the coke has a 2-inch drop shatter of at least 80% when using a starting material having a size of at least 4 inches in a drop shatter test.

7. The coke of claim 1, wherein the coke has a 4-inch drop shatter of at least 30% when using a starting material having a size of at least 4 inches in a drop shatter test.

8. The coke of claim 1, wherein the coke has a 2-inch drop shatter of at least 40% when using a starting material having a size of at least 4 inches in a drop shatter test.

9. The coke of claim 1, further comprising an ash content between 5 and 12%.

10. The coke of claim 1, wherein the coke has a sulfur content of less than 0.8%.

11. The coke of claim 1, wherein the coke has a sulfur content of less than 0.7%.

12. The coke of claim 1, further comprising a moisture content between 1% and 10%.

13. The coke of claim 1, further comprising a moisture content less than 15%.

14. The coke of claim 1, further comprising a gray or light gray color.

15. The coke of claim 1, wherein the fixed carbon content is at least 85%.

16. A coke comprising a Coke Reactivity Index (CRI) between 25 and 45%, a fixed carbon content of at least 85%, a sulfur content less than 0.9%, an ash content between 5% and 12%, and a length:width ratio of at least 1.1.

17. A coke comprising a Coke Reactivity Index (CRI) of at least 25%, a fixed carbon content of at least 80%, and a sulfur content less than 1.0%.

18. The coke of claim 17, wherein the fixed carbon content is at least 85%, a sulfur content less than 1.0%.

19. The coke of claim 18, further comprising an ash content between 5% and 12%.

20. The coke of claim 19, further comprising a length:width ratio of at least 1.1.

* * * * *